United States Patent [19]

Smith et al.

[11] Patent Number: 5,747,102
[45] Date of Patent: May 5, 1998

[54] METHOD AND APPARATUS FOR DISPENSING SMALL AMOUNTS OF LIQUID MATERIAL

[75] Inventors: James C. Smith, Amherst; Patrick T. Hogan, Lorain; Laurence B. Saidman, Avon Lake, all of Ohio

[73] Assignee: Nordson Corporation, Westlake, Ohio

[21] Appl. No.: 682,160

[22] Filed: Jul. 17, 1996

Related U.S. Application Data

[63] Continuation-in-part of Ser. No. 559,332, Nov. 16, 1995, which is a continuation-in-part of Ser. No. 607,126, Feb. 26, 1996.

[51] Int. Cl.⁶ .................................................. B05D 5/12
[52] U.S. Cl. ........................ 427/96; 222/1; 222/146.5; 222/504; 228/102
[58] Field of Search .................... 222/1, 61, 146.5, 222/389, 504, 518; 427/8, 96, 256, 287; 228/102

[56] References Cited

U.S. PATENT DOCUMENTS

| | | | |
|---|---|---|---|
| 2,025,509 | 12/1935 | Hieber | 219/27 |
| 3,943,527 | 3/1976 | Hartman. | |
| 4,066,188 | 1/1978 | Scholl et al. | 222/504 X |
| 4,120,086 | 10/1978 | Crandell. | |
| 4,161,386 | 7/1979 | Osuna-Diaz. | |
| 4,447,706 | 5/1984 | Eder et al.. | |
| 4,644,140 | 2/1987 | Hillinger. | |
| 4,711,379 | 12/1987 | Price | 222/504 |
| 4,753,819 | 6/1988 | Shimada | 427/96 |
| 4,784,582 | 11/1988 | Howseman, Jr.. | |
| 4,848,606 | 7/1989 | Taguchi et al.. | |
| 4,926,029 | 5/1990 | Pearson. | |
| 4,942,998 | 7/1990 | Horvath et al. | 228/102 |
| 4,953,755 | 9/1990 | Dennison. | |
| 4,967,933 | 11/1990 | Maiorca et al.. | |
| 5,052,338 | 10/1991 | Maiorca et al.. | |
| 5,074,443 | 12/1991 | Fujii et al.. | |
| 5,151,025 | 9/1992 | Müller. | |
| 5,205,439 | 4/1993 | Strum. | |
| 5,266,349 | 11/1993 | Bok | 427/8 |
| 5,277,344 | 1/1994 | Jenkins | 222/504 |
| 5,320,250 | 6/1994 | La et al. | 222/1 |
| 5,328,085 | 7/1994 | Stoops et al. | 228/33 |
| 5,364,011 | 11/1994 | Baker et al. | 228/180.21 |
| 5,462,199 | 10/1995 | Lenhardt | 222/504 X |
| 5,524,792 | 6/1996 | Wakabayashi et al. | 222/146.5 |

FOREIGN PATENT DOCUMENTS

| | | |
|---|---|---|
| 0423388 | 4/1991 | European Pat. Off.. |
| 2036279 | 12/1970 | France. |
| 2637520 | 4/1990 | France. |

OTHER PUBLICATIONS

*Dispersing for Surface Mount Shoots into the Future with DispenseJet™ Technology from Asymtek*, Asymtek Engineering Tech Report, no date.

*Viscosity and Its Relationship to Fluid Dispensing*, Douglas Shade, Electronic Packaging & Production, Jun. 1991.

*Adhesive Dispenser Provides±2% Volume Repeatability*, Brian J. Hogan, Design News, Apr. 11, 1994, pp. 75, 77.

*Primary Examiner*—Michael Lusignan
*Attorney, Agent, or Firm*—Howard M. Cohn

[57] ABSTRACT

Apparatus and methods for dispensing droplets of liquid or viscous material are disclosed. A valve is opened to dispense a stream of the heated liquid or viscous material through an elongated orifice of a nozzle. The stream of material being dispensed from the elongated orifice is broken into droplets by rapidly closing the valve. Furthermore, a method for varying the height of a droplet of liquid or viscous material is disclosed by which two or more droplets combine to form a droplet of a desired height. A method for applying a plurality of droplets of material onto a substrate so that the droplets flow together to form a uniform film of desired thickness and shape is also disclosed. A second embodiment of the invention relates to dispensing apparatus with a heater assembly removably attached to the dispenser housing. Another modification of the invention relates to a modified seat assembly wherein the valve has three positions with respect to the valve seat and a modified nozzle assembly wherein the nozzle is constructed of a thin walled tube.

32 Claims, 11 Drawing Sheets

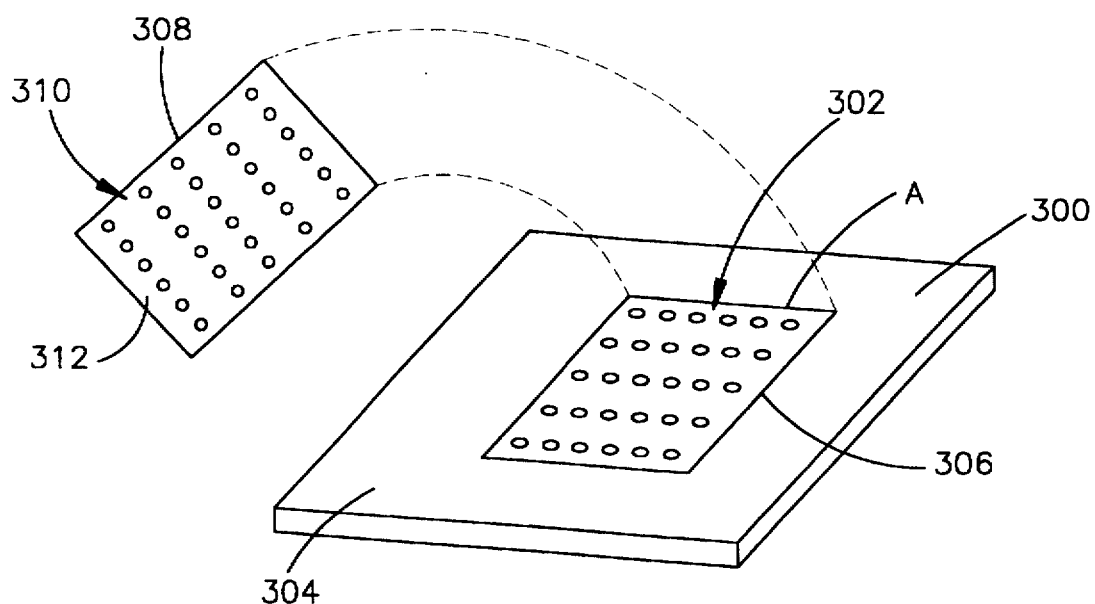
Fig.5
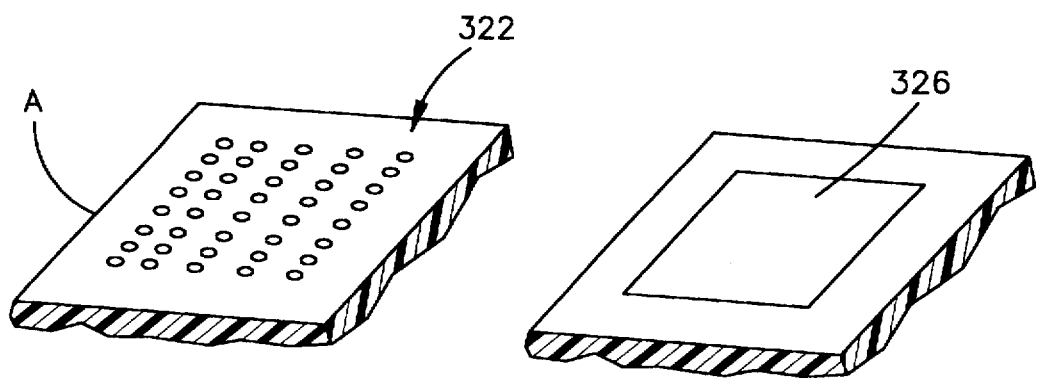
Fig.6
Fig.7

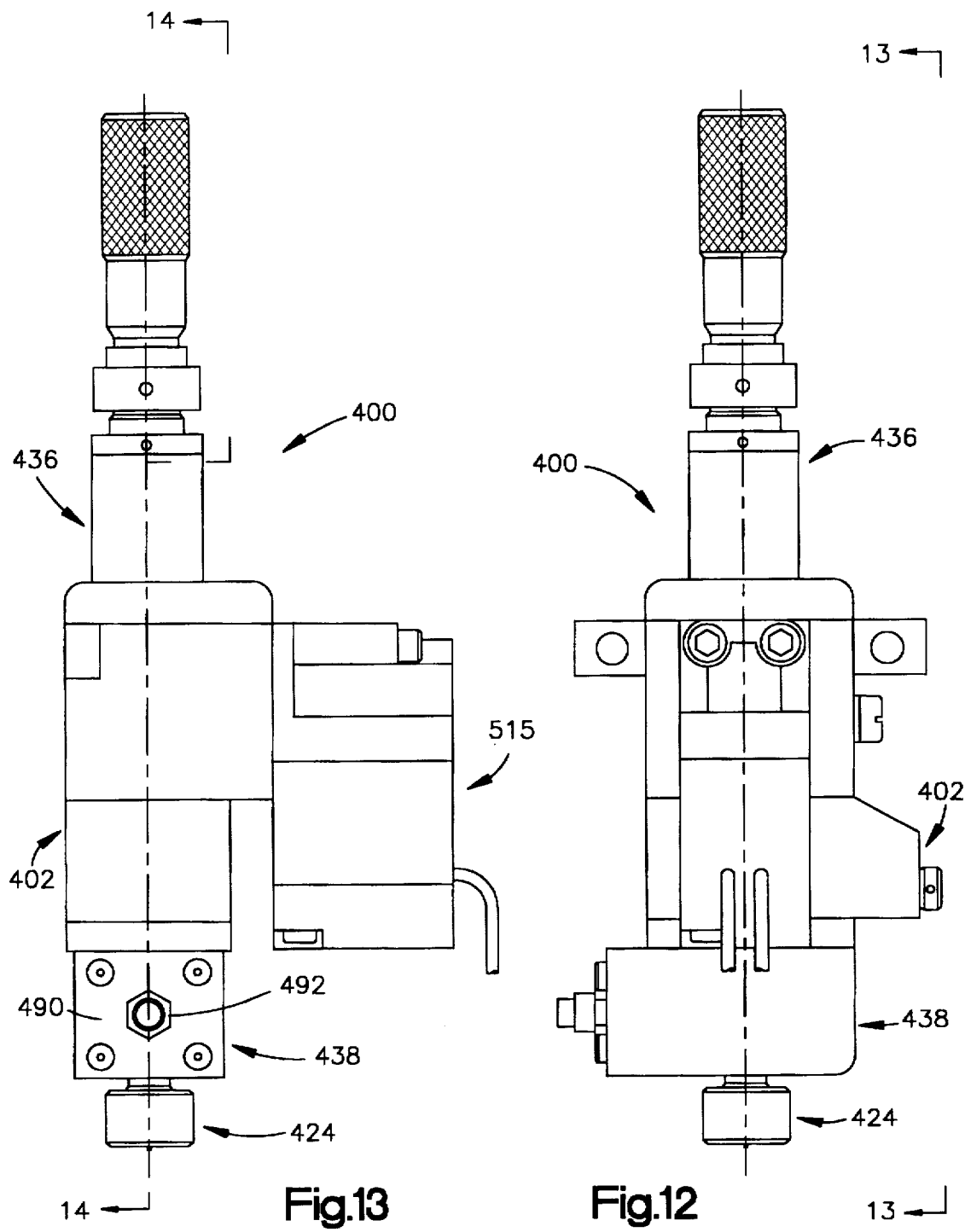

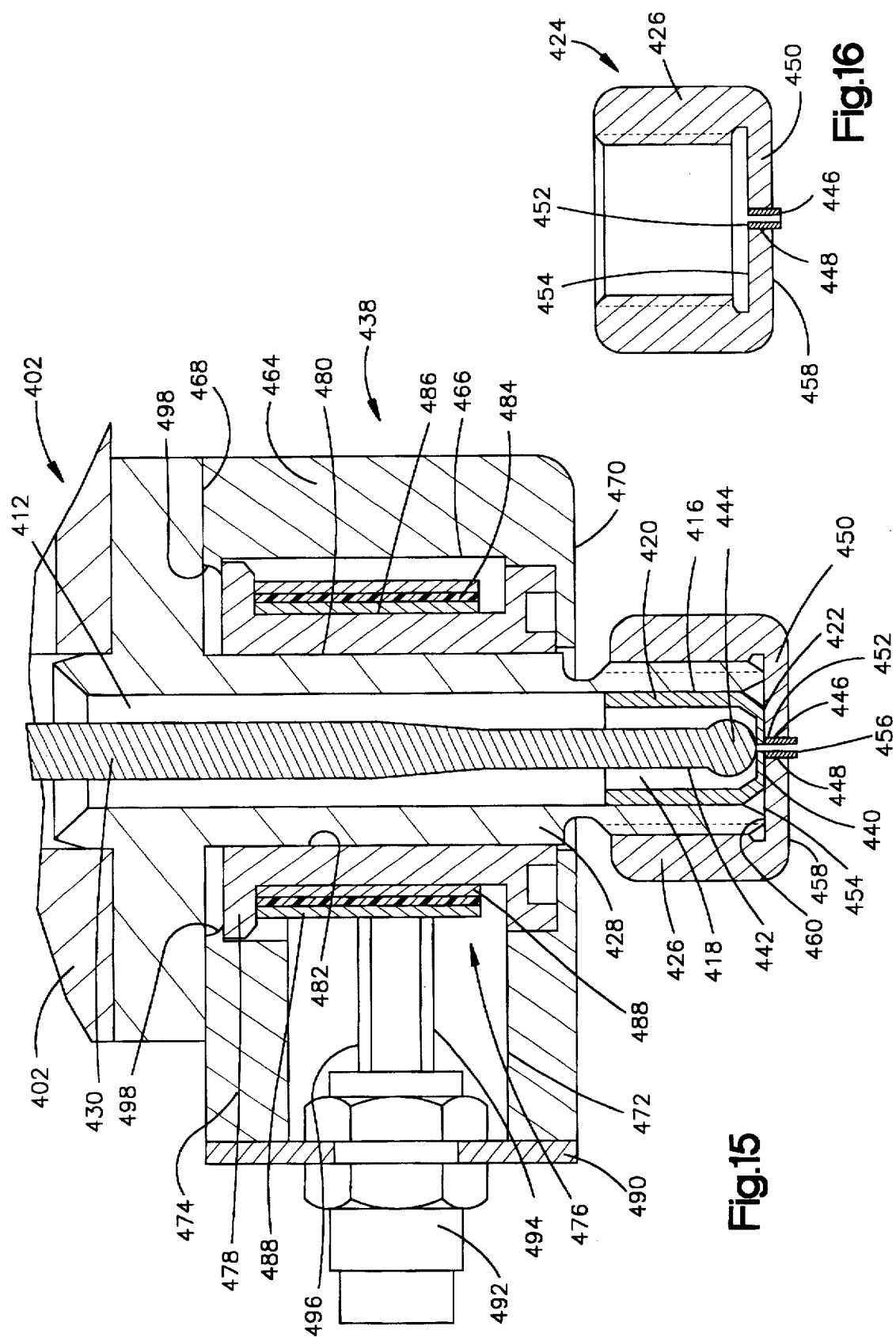

METHOD AND APPARATUS FOR DISPENSING SMALL AMOUNTS OF LIQUID MATERIAL

RELATED APPLICATIONS

This is a continuation-in-part of U.S. patent application Ser. No. 08/559,332 filed Nov. 16, 1995, which in turn is a continuation-in-part of U.S. patent application Ser. No. 08/607,126 filed Feb. 26, 1996.

FIELD OF THE INVENTION

This invention relates to the field of dispensing liquid materials, and more particularly, to a method and apparatus for rapidly dispensing minute amounts of adhesive viscous material, solder fluxes or other liquid materials in the assembly of electronic components and printed circuit boards.

BACKGROUND OF THE INVENTION

This invention pertains to a method and apparatus for dispensing fluid materials in the electronic industry, and on a surface such a printed circuit board. However, it will be appreciated that the invention has broader applications and may be advantageously employed with other industries.

In fabricating a printed circuit (PC) board, which defines a substrate surface for a printed circuit assembly, three general types of boards are frequently encountered. The first is known as a surface mount board in which only surface mount components are used. The components can be placed on a printed circuit board on which an adhesive has been placed to secure the components. Then the board with the glued components can be placed in an oven to cure the adhesive and hold the components in place. Next, the boards and components can be sent through a wave solder machine to complete the electrical connections. Another method of securing these components to the board is known as reflow soldering where solder paste is placed on the board, and then the surface mount components are located as desired. The solder paste is cured as the board is heated to reflow the solder and complete the electrical connection. Thereafter, the board is cleaned.

The second type of board uses through hole components. As the name implies, these electrical components have leads that extend through holes or openings in the board. The leads are soldered to complete the electrical connection.

In a mixed technology board, a combination of surface mount components and through hole components are used. The surface mount components are assembled and soldered as described above. After the surface mount components are secured to the first side of the board, the through hole components are then located on the board with the components leads extending through openings in the board for a subsequent soldering process. If a double-sided assembly is envisioned, the board is inverted and the surface mount components are applied to the second surface.

In either situation, a soldering operation is required on one surface, typically the bottom surface, of the board. There are a number of common soldering processes. The entire soldering process is actually comprised of three separate and essential steps which are normally preformed within a single machine. These steps include (I) flux application, (ii) preheating the board, and (iii) soldering. Soldering flux is generally defined as "a chemically and physically active formula which promotes wetting of a metal surface by molten solder, by removing the oxide or other surface films from the base metals and the solder. The flux also protects the surfaces from reoxidation during soldering and alters the surface tension of the molten solder and the base metal." A printed circuit board must be cleaned with flux to effectively prepare the board for soldering and to properly wet the components.

Four general types of fluxes are in common commercial use. Of these, rosin based fluxes are the most widely used, even though they normally require a subsequent cleaning operation to remove rosin flux residue on the board. The residue can adversely impact subsequent testing of the printed circuit board.

Another major category of fluxes includes water soluble fluxes which, as the name suggests, are designed to be cleaned in a aqueous solution. For a variety of reasons, though, this technology is not yet readily accepted.

Likewise, a third category is synthetic activated fluxes, which are decreasing in demand for a number of reasons. For example, the residues must be removed with chlorofluorocarbon (CFC) based cleaners which raises environmental concerns.

A fourth type of flux receiving greater attention in light of the environmental concerns are termed low solids fluxes. Low solids fluxes contain small amount of solids, e.g. five weight percent or less. Use of low solids fluxes are intended to limit the amount of residue remaining on the board after soldering is completed so that subsequent cleaning operations can be eliminated.

As alluded to above, commercial cleaning operations typically employ CFC's. Studies presently indicate that the use of CFC's destroy, or adversely contribute to the destruction of, earth's stratospheric ozone. Thus, elimination of subsequent cleaning operations for printed circuit boards will, in turn, address environmental concerns of ozone depletion associated with post soldering cleaning processes.

Generally speaking, fluxes commonly incorporate a solvent, a vehicle, an activator, a surfactant and an antioxidant. The solvent is the liquid carrier for the flux ingredient. As isopropanol or similar type of alcohol is often used as the solvent. The vehicle component of the flux serves as a high temperature solvent during the subsequent soldering operation. The activator, on the other hand, removes contaminants such as oxides to present a wettable surface for the soldering operation. The surfactant encourages solder wetting while the antioxidant limits reoxidation of the component leads.

In the manufacture of printed circuit boards, it is frequently necessary to apply minute amounts or droplets of liquid materials, including solder fluxes and viscous liquid materials, i.e., those with a viscosity greater than fifty centipoise, to the circuit boards. These liquid and viscous materials, besides solder flux, include adhesives, solder paste, solder mask, grease, oil, encapsulants, potting compounds, inks, and silicones.

Known structures and methods for applying flux to a printed circuit board includes liquid wave, foaming, brushing, pad printing, or spraying, as described in U.S. Pat. No. 5,328,085, are all deemed deficient in one manner or another in achieving the overall goals of uniformity, selectivity and effectiveness of flux application.

A preferred method of application to a substrate such as a circuit board is dispensing the viscous materials from a syringe or a valve. Syringe or valve dispensing is widely used and is accomplished with pneumatic mechanisms or positive displacement valves. It is difficult to dispense more than four dots of viscous material per second with a syringe dispenser.

Typically, as discussed in U.S. Pat. No. 5,320,250, syringe dispensers usually place the syringe tip of the dispenser very close to the substrate, i.e., a distance of 0.005 inches for a very small droplet and a distance of 0.060 inches for a larger droplet. The viscous material is pushed out of the syringe tip and contacts the substrate while it is still connected to the syringe tip. If the viscous material fails to contact the substrate, it will not adhere to the substrate and no droplet will result. The contacting of the viscous material with the substrate is called "wetting." After the viscous material contacts the surface of the substrate, the tip is pulled back and the resulting string is broken to form a droplet.

One problem with the prior art systems is the stringing or sticking of a bead of the liquid material to the nozzle which adversely effects the ability of the delivery system to dispense precise, quantitative amounts of liquid material. Stringing is most likely to occur at lower pressures, for instance when the pressure in the syringe is ramping up or ramping down. For this reason, stringing also occurs more frequently as dispensing time decreases. Stringing of the liquid material from the nozzle tip during the final stage of dispensing may be avoided to some extent by making the internal pressure of the syringe negative. However, when dispensing again commences, a build-up of liquid at the nozzle tip almost invariably occurs, thus adversely affecting the stability of the subsequent extrusion.

Another approach to dispensing fluid from a syringe is disclosed in U.S. Pat. No. 5,320,250 where the dispensing apparatus includes a reservoir or syringe of a viscous material which communicates with a chamber for continuously receiving the viscous material therefrom. The chamber has a flexible resilient diaphragm which forms an exterior wall thereof. An impact mechanism applies a predetermined momentum to the diaphragm to propel a predetermined, minute quantity of the viscous material from the chamber through a nozzle at a high velocity. This minute quantity takes the form of a very small jet of viscous material. As the impact energy is removed by means of a stop, the sudden decrease of the chamber pressure and the forward momentum of the jet "pinches" the jet to form a droplet. For many viscous materials, the chamber is heated to control the viscosity of the material. The reservoir is preferably pressurized with gas to force the viscous material into the chamber. One problem with this type of design is that the high velocity imparted to form the jet of viscous material causes the jet tail to break into smaller droplets forming satellites.

To overcome some of the problems of the prior art devices, a two-stage delivery system is used where the viscous material resides in a syringe under a constant air pressure of about 4 psi to about 12 psi, depending on the viscosity, which insures steady flow of the material into a chamber of a rotary positive displacement pump. The pump dispenses as many as 25,000 dots of the viscous fluid per hour onto a high density, printed circuit (PC) board. Since the viscous material is pushed out of the syringe tip and contacts the substrate while it is still connected to the tip, the same problems as described above relating to delivery from a syringe exists.

While the prior art has reduced many of the problems relating to the application of liquid or adhesive viscous material droplets onto a work piece such as a PC board, the problem of stringing of the liquid or viscous material to the nozzle when rapid application is required forces the robot onto which the dispenser is mounted to move up and down for each droplet. This movement reduces the speed with which the droplets can be applied.

Another problem relating to dispensing low solid fluxes relates to selectively applying solder flux to carriers in the production of flip chip and ball grid array (BGA) assemblies. In flip chip assemblies, flux is applied to the interconnect area of the chip carrier, also known as the mother board. Then, a silicon die or chip having a solder ball, typically between about 0.003 inches to about 0.005 inches (about 3 mils to about 5 mils) in diameter, at each of the hundreds of points of connection on one side of the chip is placed on the mother board.

To get the solder to flow, the mother board is heated so that the balls of solder which are in contact with the flux form a soldered connection between the chip and the mother board. One problem with the prior art method of applying the low solid, typically resin based fluxes, is that more flux was applied than needed. This resulted in longer clean up time, wasted material and longer processing time. Moreover, when the thickness of the flux applied to the mother board was too great, that is thicker than the diameter of the solder balls, the chip would have a tendency to "float" when the solder balls melted resulting in poor alignment and/or bad interconnections between the chip and the mother board.

Another problem relating to the application of solder flux relates to other boards having through hole components. In this case, the board has through holes or openings throughout and the leads of electrical components are inserted in the holes. Since the soldering of the leads within the holes requires the application of the flux, it would be very advantageous to be able to apply the flux solely to the area of the through hole where the leads are to be inserted.

OBJECTS AND SUMMARY OF THE INVENTION

It is an object of the present invention to provide a method and apparatus for dispensing small amounts of liquid or viscous material at an elevated temperature from a nozzle orifice spaced above a printed circuit board to obviate the problems and limitations of the prior art methods and apparatus.

It is a further object of the present invention to provide a method and apparatus for dispensing small amounts of liquid or viscous material by heating small amounts of the liquid or viscous material to an elevated temperature where the stringing is reduced and the formation of satellites is minimized.

Still another object is to provide a method and apparatus for dispensing small droplets of liquid or viscous material through an elongated orifice of a heated nozzle by rapidly closing a valve against a valve seat to impart kinetic energy to the material so that it breaks off from the end of the nozzle from which it is being dispensed and is propelled downward onto a substrate to form a minute droplet of the liquid or viscous material on the board.

Yet another object of the present invention is to provide a method for dispensing the number of a droplets of a liquid or viscous material varying through an elongated orifice of a nozzle onto a substrate so that at least two of the droplets fall on each other and combine to form a final droplet on the surface of a desired shape.

Still another object of the present invention is to provide a method for varying the height of the top surface of a droplet of liquid or viscous material above the surface of a substrate onto which the droplet is dispensed by controlling the temperature of the nozzle heater.

A further object of the present invention is to provide a method for applying a solder flux to the surface of a mother board to which a flip chip with solder balls at each point of interconnection is to be mounted so that the thickness of the flux is less than the diameter of the solder balls.

Another object of the present invention is to provide a method for selectively applying a plurality of droplets of solder flux onto the surface of a substrate such as a PC board so that the droplets of solder flux flow together to form a uniform film of desired thickness.

Yet another object of the present invention is to provide an apparatus for dispensing small droplets of liquid or viscous material which includes a heater assembly disposed about a heated extension element of the dispenser housing so that the heater assembly can be easily removed for cleaning of the heating extension element.

Another object of the present invention is to provide an apparatus for dispensing small droplets of liquid or viscous material wherein the nozzle is constructed of a thin walled tube and can be coated with a plastic.

A further object of the present invention is to provide a method for dispensing small droplets of liquid or viscous material wherein a valve has three positions with respect to the valve seat so that in the first position the majority of the material flows back to source as well as to a nozzle. In the second position, the flow to the source is reduced and the remainder flows to the nozzle to dispense a string of material from the nozzle. Finally, when the valve seats against the seat, the flow from the source stops and the stream being dispensed from the nozzle is broken to form a droplet.

In accordance with the invention, there is provided a method for dispensing small amounts of liquid or adhesive material, such as flux or surface mount adhesive. The method comprises the following steps. Pressurized liquid or viscous material is dispensed from a dispensing apparatus into a valve assembly. The pressurized liquid or viscous material is heated in the valve assembly to a temperature of between about 22° C to about 75° C and dispensed as a stream through an elongated orifice of a nozzle mounted to the valve assembly. The stream of the heated, pressurized liquid or viscous material is broken away from the nozzle to form a droplet by rapidly closing the valve assembly. The droplet is propelled downward onto a printed circuit board to form a minute droplet of the liquid or viscous material on the circuit board.

Further in accordance with the invention, a dispensing apparatus is provided for dispensing small amounts of liquid or viscous material. The dispensing apparatus includes a housing assembly connected to a syringe of pressurized liquid or viscous material and an outlet tube through which the pressurized liquid or viscous material is dispensed. A valve seat assembly is mounted to a free end of the outlet tube. The valve seat assembly has a flow passage extending therethrough with a valve seat at one end of the flow passageway and a nozzle at an opposite end of the passageway. A valve shaft, extending through the housing assembly and projecting out of the outlet tube, has one end normally disposed in seating engagement with the valve seat to close the flow passageway. A control mechanism reciprocates the valve shaft out of and into sealing engagement with the valve seat. A heating element is disposed adjacent the valve seat assembly for heating liquid or viscous material within the valve seat assembly.

Also in accordance with the invention, there is disclosed a method for varying the number of a droplets of liquid or viscous material dispensed through an elongated orifice of a nozzle of the dispensing apparatus onto a substrate so that at least two of the droplets fall on each other and combine to form a final droplet on the substrate of a desired shape.

Still another embodiment of the present invention relates to a method for varying the height of the top surface of one or more droplets of liquid or viscous material above the surface of a substrate onto which said droplet is dispensed by setting the temperature of the heating element disposed adjacent the valve seat assembly of the dispensing apparatus.

Further in accordance with the invention, there is disclosed a method for selectively applying a plurality of droplets of solder flux onto the surface of a substrate such as a PC board so that the droplets of flux flow together to form a uniform film or coating of desired size or thickness.

Also, in accordance with the invention, there is disclosed a second embodiment of a dispensing apparatus which includes a dispenser housing having an elongated heated extension element with a valve seat assembly mounted in the lower end of a flow bore extending through the heating extension element. A nozzle assembly is mounted to the lower end of the heated extension element and a heating assembly is removably disposed around the elongated heated extension element.

In accordance with the invention, a method for dispensing small amounts of liquid material is disclosed. The method comprises the steps of supplying liquid material to an inlet end of a first flow passage extending through a valve assembly having a valve seat disposed near an outlet end of the first flow passage and a reciprocating valve located within the first flow passage. A second flow passage extending through a nozzle assembly is filled with the liquid material when the valve head is in a first position spaced from the valve seat. The second flow passage has an inlet section to receive the liquid material from the outlet end of the first flow passage and an outlet section with an orifice extending through an elongated nozzle from which the liquid material is dispensed. The valve is accelerated from the first position to a second position spaced closer to the valve seat whereby a portion of the majority of the liquid material in the first flow passage flows towards the inlet end of the first flow passage and the remaining liquid material in the first flow passage flows from the outlet end into the second flow passage and is dispensed from an outlet of the elongated nozzle as a stream of liquid material. The valve continues to move from the second position towards a third position in seating engagement with the valve seat whereby the flow of the liquid material towards the inlet end of the first flow passage is decreased and the flow of liquid material through the second flow passage is rapidly increased. Finally, the valve is moved to the third position where the valve seats against the valve seat whereby the flow of the liquid material towards the inlet end of the first flow passage is cut-off and the stream of liquid material being dispensed from the outlet of the elongated nozzle is broken from the outlet end of the nozzle orifice to form droplets.

Also in accordance with the invention, an apparatus for dispensing small amounts of liquid material comprises a nozzle assembly with an elongated nozzle constructed of a thin walled tube. The outlet end and the orifice of the nozzle can be coated with a plastic.

BRIEF DESCRIPTION OF THE DRAWINGS

The structure, operation, and advantages of the presently preferred embodiment of the invention will become further apparent upon consideration of the following description taken in conjunction with the accompanying drawings, wherein:

FIG. 5 is an exploded 3 dimensional view of a chip carrier and a flip chip which is to be solder mounted to the chip carrier;

FIG. 6 is a three dimensional view of the electrical connector area A of FIG. 5 on with a plurality of droplets of solder flux deposited thereon;

FIG. 7 is a top view of the area of droplets of flux material as shown in FIG. 6 after the droplets have flown into each other to form an area with a uniform coating of flux;

FIG. 12 is a front view of a second embodiment of a liquid or viscous material dispensing apparatus in accordance with the invention;

FIG. 13 is a view along line 13—13 of FIG. 12;

FIG. 15 is an enlarged view of the elongated heated extension element of the dispenser housing surrounded by a heating assembly and including a nozzle assembly;

FIG. 16 is a cross sectional side view of the nozzle assembly illustrated in FIG. 15;

DETAILED DESCRIPTION OF THE INVENTION

Figure 1:
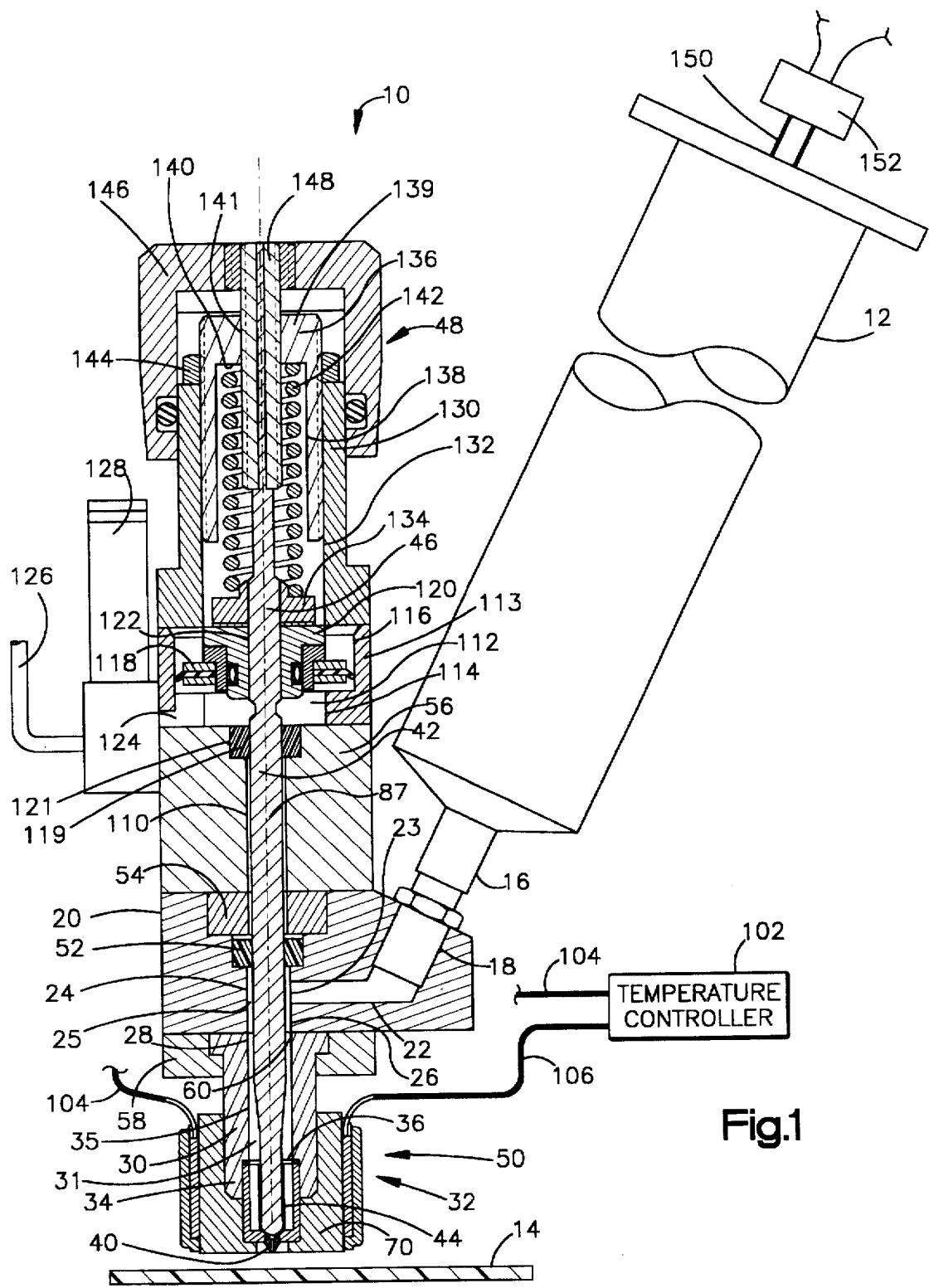
FIG. 1 is a side view, in cross section, of a preferred embodiment of a liquid or viscous material dispensing apparatus disposed above a PC board, in accordance with the invention.
Figure 2:
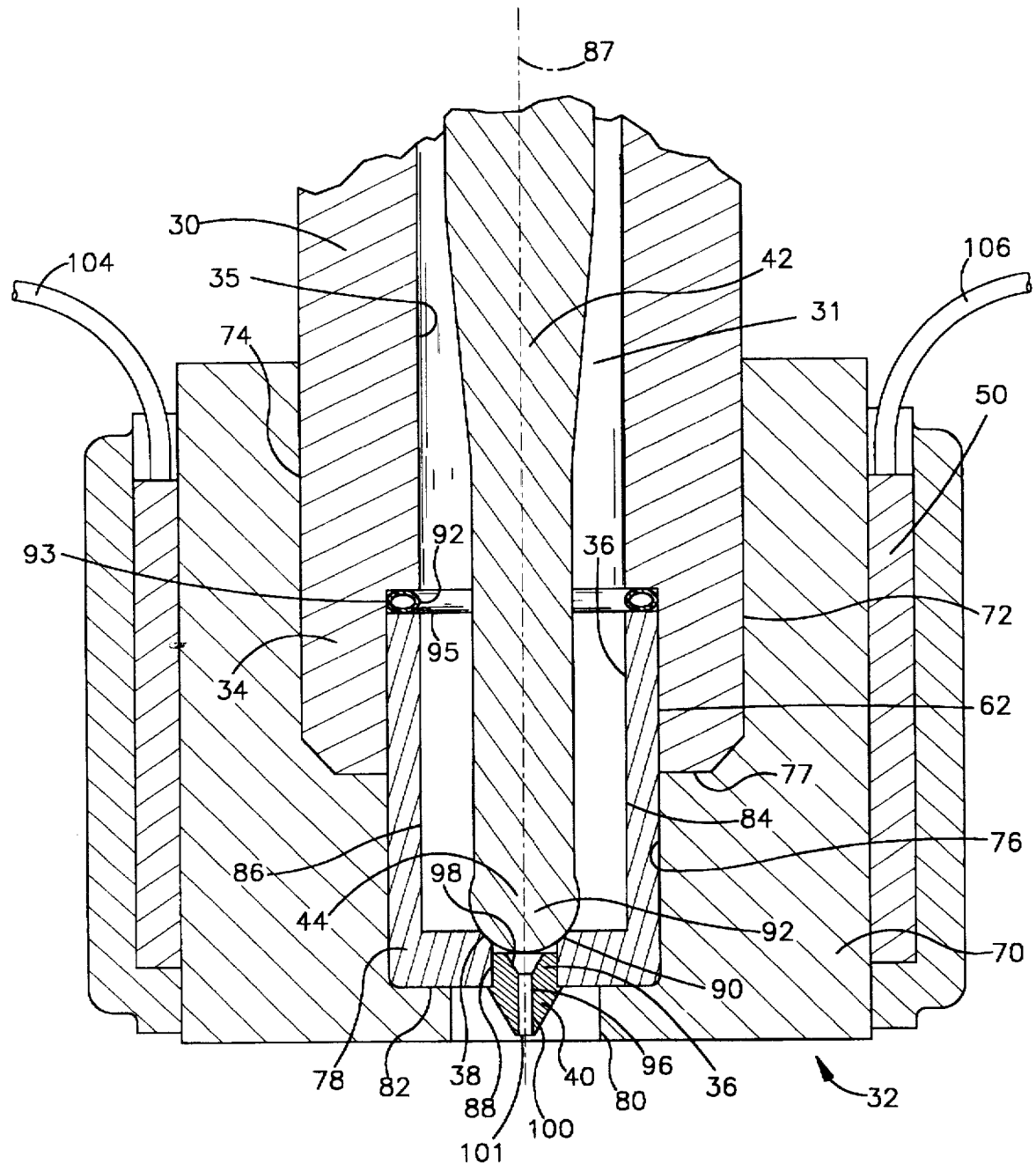
FIG. 2 is an enlarged side view, in cross section, of the valve seat assembly shown in FIG. 1 having a nozzle with an elongated nozzle orifice from which a stream of the liquid or viscous material is dispensed.

Referring to FIGS. 1 and 2, there is illustrated a dispensing apparatus 10 for dispensing small amounts of liquid or viscous material from a standard, commercially available, liquid or viscous material filled syringe 12 onto a substrate 14, such as a printed circuit (PC) board. A dispenser housing 20 of apparatus 10 has an inlet 18 into which is mounted an outlet 16 of syringe 12. Inlet 18 is connected by a bore 22 to an inlet opening 23 of a flow bore 24 forming a flow passage 25. An outlet 26 of flow bore 24 is connected to a first end 28 of a bore 35 extending through an outlet tube 30 and forming a flow passage 31 from which the pressurized liquid or viscous material is dispensed. A valve seat assembly 32 is mounted to a second free end 34 of outlet tube 30. Valve seat assembly 32 has a flow passage 36 extending therethrough with a valve seat 38 disposed therein. The inlet end of flow passage 36 is in flow communication with the flow passage 31 of outlet tube 30 and the opposite outlet end of passageway 36 has a nozzle 40 mounted thereto.

A valve shaft 42 extends through flow bore 24 of housing assembly 20, through bore 35 of outlet tube 30 and into flow passage 36 of valve seat assembly 32. Valve shaft 42 has a lower end 44 adapted for sealing engagement with valve seat 38 to close passageway 36. An opposite upper end 46 of shaft 42 is engaged with the control mechanism 48 of dispensing apparatus 10. Control mechanism 48 reciprocates valve shaft 42 out of and into seating engagement with valve seat 38. Also, according to the invention, a heating element 50 is disposed adjacent valve seat assembly 32 to heat a very small volume of the liquid or viscous material in the valve seat assembly as discussed in more detail below.

Dispenser housing 20 includes a generally horizontal bore 22 connecting inlet 18 to the vertically disposed flow passage 24 through which valve shaft 42 is reciprocally received. A seal ring 52 is disposed in sealing relation about shaft 42 and is located above inlet 23 of flow passage 24 to insure that the viscous fluid flowing through bore 22 and into flow passage 24 does not leak past valve shaft 42 and into the control mechanism 48. Seal ring 52 is secured in place by a ring 54 which in turn is held in place by the bottom surface of the housing block 56 of control mechanism 48.

As shown in FIG. 1, outlet tube 30 has a first end secured to dispenser housing 20 by conventional means, such as for example a mounting plate 58, so that the outlet 26 of flow passage 24 is aligned with an inlet opening 60 of bore 35 extending through outlet tube 30. The outlet tube 30 has a second end 34 onto which valve seat assembly 32 is secured by conventional means such as by a threaded connection (not shown).

Valve seat assembly 32 (see FIG. 2), includes a generally cylindrical mounting body 70 with an axial stepped bore 72 extending therethrough. Axially stepped bore 72 has an upper end section 74 which surrounds and is securely attached to outlet tube 30 by any conventional means, such as for example a threaded connection (not shown). Axially stepped bore 72 includes an intermediate section 76, which intersects and has a smaller diameter than upper end section 74. The lower end 34 of outlet tube 30 is seated against shoulder 77 formed at the intersection of intermediate section 76 and upper end section 74. A cup-shaped valve seat component 78 is located within intermediate section 76. Stepped bore 72 has a lower end section 80 which has a smaller diameter than and intersects intermediate section 76 to form a shoulder 82 against which the lower end of cup-shaped valve seat component 78 is seated.

Cup-shaped valve seat component 78, as best seen in FIG. 2, has a flow passage 36 through a central stepped bore 84 extending therethrough. Stepped bore 84 has an elongated upper end section 86 which is substantially co-axial with the bore 35 of outlet tube 30 about central axis 87. A lower end section 88 of central step bore 84 has a smaller diameter than the upper end section 86. The valve seat 38 is formed by an intermediate tapered section 90 between upper end section 86 and lower end section 88. Cup-shaped valve seat component 78 is securely attached within a counterbore 62 into bore 35 at the lower end 34 of outlet tube 30 by mounting body 70. A seal ring 91, located in a groove 93 at the intersection of counter bore 62 and bore 35, seals against the upper end 95 of the valve seat component 78 to prevent leakage of the liquid or viscous fluid between the valve seat component 78 and the mounting body 70. At the lower end 44 of valve shaft 42, is a generally spherical shaped valve head 92 which seats against valve seat 38. While a spherical shaped valve head is disclosed, it is also within the terms of the invention to use other shaped valve heads as desired.

A principal feature of the invention relates to nozzle assembly 40 which is secured within the lower end section 88 of valve seat component 78 by conventional means such as with a brazed connection. Nozzle assembly 40 includes a flow passage 96 extending therethrough. Flow passage 96 has an inlet section 98 which is in flow communication with flow passage 36 extending through lower end section 88. Flow passage 96 also includes an elongated nozzle orifice 100 with an upper end that is aligned with and intersects inlet section 98 and with an outlet end 101 from which a stream of liquid or viscous material is dispensed. Elongated nozzle orifice 100 has a ratio of length to diameter of at least about 3 to 1 and up to about 5 to 1. The elongated nozzle typically has a length of between about 0.016 and about 0.080 inches and a diameter of between about 0.003 and about 0.016 inches. The length of the orifice 100 is important because if it is too long, the liquid or viscous material won't break off from the end of nozzle 40 when the valve head 92 closes against valve seat 38. Alternatively, if the length of orifice 100 is too short, the liquid or viscous material won't form a string, or more importantly, the droplets won't be dispensed in a straight path to the substrate 14 onto which they are being applied.

As best seen in FIG. 2, a heating element 50 is disposed about and secured to the mounting body 70 in the area of and adjacent to the valve seat assembly 32 to heat a very small volume of pressurized liquid or viscous material within cup-shaped valve seat component 78, as discussed in more detail below. The heating element 50 is formed of a thermofoil resistance heater backed on Kapton from Minco Products Company of Minneapolis, Minn. and is connected to a temperature controller 102 by wire leads 104 and 106.

Another important feature of the invention relates to the control mechanism 48 for reciprocating valve head 92 between a first position spaced from valve seat 38 (not shown) and a second position (as shown in FIG. 2) in seating engagement with valve seat 38. The second position is the default position because the liquid or viscous material collects in the upper end section 86 of valve seat component 78 and is heated to a preset temperature with temperature controller 102, as discussed below. As seen in FIG. 1, the control mechanism 48 includes housing block 56. A centrally disposed longitudinal bore 110 extends through housing block 56 and is coaxially formed about axis 87. Valve shaft 42 extends through bore 110 and projects from the upper end of bore 110 into a stepped bore chamber 112 of an air chamber block 113 having a lower bore 114 which intersects an upper bore 116 having a larger diameter than lower bore 114. A cylindrical seal element 118 is mounted onto a support structure 120 which in turn has a central bore 122 through which valve shaft 42 extends and is fixedly attached thereto. An air inlet 124 is connected to a source of pressurized air (not shown) by a tube 126. An air solenoid 128, located between tube 126 and inlet 124, controls the air flow into the chamber formed below seal 118 in lower bore 114. An air seal ring 119 about shaft 42 is located in a counterbore 121 between bore 110 and bore chamber 112 to prevent air leakage into bore 110.

A spring housing 130 is mounted against the top surface of air chamber block 113 and is formed with a central bore 132. A spring retainer 134 is securely mounted onto the upper end of valve shaft 42 and abuts against the support structure 120. A cup-shaped spring adjustment component 136 is threadably secured to spring housing 130 and has an elongated bore 138 open at one end and closed at the other end by a base 139 with a bore 141 extending therethrough and an interior bottom surface 140 about bore 141. A compression spring 142 extends between spring retainer 134 and the bottom surface 140 of spring adjustment component 136. A lock nut 144 is threadably secured to spring adjustment component 136 by threads so that the component 136 can be locked into position closer to or further away from spring retainer 134. The compression of spring 142 is increased as the spring component 136 is moved towards spring retainer 134 and decreased as the spring component 136 is moved away from spring retainer 134.

An important feature of the invention relates to the closure force exerted by compression spring 142 on spring retainer 134 and ultimately, valve head 92 of valve shaft 42. Preferably, compression spring 142 has a pre-loaded height of about one inch and a closure force of about 13 to about 17 pounds. The compression of spring 142 can be adjusted by positioning spring adjustment component 136, as previously discussed.

Another feature of the control mechanism 48 is a knob 146 which is attached to a rod 148 that is threadably secured in bore 141 and which passes through compression spring 142 to bear against the top end of valve shaft 44 extending above the spring retainer 134. By moving the rod 148 up or down, the stroke of the valve shaft 42 can be adjusted with respect to the valve seat 38.

To further appreciate the advantages of the present invention, a description of the operation follows. First, a syringe 12 of liquid or viscous material, typically having a viscosity of between about 50,000 and about 250,000 centipoise, is mounted to the inlet opening 18 of a dispenser housing 20. An air tube 150 connected to a pressure regulator 152 and a source of low pressure air (not shown) is coupled to the inlet of syringe 12 to force the liquid or viscous material into bore 22 and flow passage 24 about the valve shaft 42 at a constant pressure of about 4 psi to about 30 psi. In the default closed position, as shown in FIGS. 1 and 2, the cup-shaped valve seat component 78 is filled with a small amount of the liquid or viscous material while the valve head 92 is seated against valve seat 38. The mounting body 70 is formed of a heat conducting material, such as for example brass, to transfer heat from heating element 50, which is disposed around and secured to mounting body 70, into valve seat component 78, typically constructed of tungsten carbide, to heat the liquid or viscous material in valve seat component 78 which surrounds valve shaft 42.

During this stage of operation, the liquid or viscous material, such as an adhesive, is heated to a temperature range (depending on the material) of between about 22° C to about 75° C and preferably between about 40° C to about 65°C. In this temperature range, the viscous modulus stays relatively constant while the elastic modulus increases with increasing temperature. The increasing elastic modulus of the viscous material indicates that the material is more solid while at the same time exhibiting a fluid like quality based on the substantially constant viscous modulus. The nature of the viscous material, a matrix of particles, solid catalysts of a waxy nature and resin, is unlike hot melts and other polymer fluids that become more fluid at elevated temperatures. Therefore, the viscous material located in valve seat component 78 is briefly heated. During this brief period of heating, the ratio of the viscous modulus to the elastic modulus decreases. After the valve head 92 raises from seat 90, the viscous material is pushed through and out from outlet 101 of orifice 100 as a thin stream. Then, after valve head 92 impacts and closes against valve seat 90, the sudden deceleration of the flowing material overcomes the adhesive's yield stress and breaks the stream. The solid nature of the heated viscous material causes the viscous material to break off from the outlet 101 of orifice 100 rather than flow into a string. It is important to maintain the adhesive at the selected temperature range for only a brief period of time and not to exceed the temperature where the catalyst melts and the final curing of the material occurs. For this reason, only the valve seat component 78 is heated and not the remainder of dispensing apparatus 10.

To open the valve, valve shaft 42 is retracted to withdraw valve head 92 from valve seat 38. This step is accomplished by introducing pressurized air from air solenoid 128 into air inlet 124 and then into the air chamber below diaphragm seal 118. The air reacts with the seal 118 to move valve shaft 42 in a direction away from valve seat 38 and towards compression spring 142. During this period of operation, the heated viscous material flows between valve head 92 and the valve seat 38, and into nozzle orifice 100. At the same time, the viscous material located within valve seat component 78 and surrounding valve shaft 42, valve head 92, and valve seat 38 is heated by heating element 50 to a desired temperature. The resulting stream of heated, pressurized viscous material is dispensed through outlet 101 of orifice 100 of nozzle 40 as a thin stream that flows into a string connected to the outlet end 101 of orifice 100.

A key aspect of the invention is to deform the adhesive liquid or viscous material at a high frequency so that the material acts as a solid for a very brief period of time and then returns to a more fluid state when it breaks away from the outlet end 101 of orifice 100. To accomplish the breaking of the string of liquid or viscous material from orifice 100, air solenoid 128 is turned off, and the spring 142 moves valve 92 against valve seat 38 to close the valve in a very short period of time, i.e., less than about 22.6 milliseconds and preferably less than about 10.3 milliseconds. The air in air chamber 112 below diaphragm 118 is exhausted through an exhaust passage (not shown) in air solenoid 128. Simultaneously, compression spring 142 rapidly moves valve head 92 to a seated position against valve seat 38. This is a positive displacement step which pushes the heated liquid or viscous material out of the outlet end 101 of orifice 100. The impact force of the closing of valve 92 against valve seat 38 generates a shock wave through the liquid or viscous material which, in combination with the sudden deceleration of the now flowing stream of material, overcomes the yield stress of the liquid or viscous material and breaks the stream of liquid or viscous material dispensed from the outlet end 101 of nozzle 40 to form a droplet of material. The thinner the string of liquid or viscous material formed at the outlet end 101 of orifice 100, the more easily the yield stress is overcome. Note that nozzle 40 is positioned with respect to the valve head 92 so that the bottom surface of valve head 92 is adjacent to tapered inlet 98 of nozzle orifice 100 to minimize the amount of liquid or viscous material which can dissipate the shock wave generated by the closure of valve 92.

The droplets of liquid or viscous material from nozzle 40 can be dispensed at a rate of up to 200,000 droplets per hour and typically, up to about 70,000 droplets per hour. The droplets are deposited on the surface of a substrate 14, such as a printed circuit board, so that surface tension and the impact on the circuit board contributes to the final drop shape. Other factors in controlling the final drop shape include the application of heat, the use of multiple, small droplets to form a single large drop, and the height of outlet end 101 of the nozzle orifice 100 above the circuit board. Since the final dispensing step is caused by the positive displacement of valve head 92 against valve seat 38, the accuracy of the amount of volume of each drop can be carefully controlled.

The nature of the viscous material, a matrix of particles, solid catalysts of a waxy nature and resin, is that when the material reaches the temperature where the solid catalyst begins to melt, a cross link reaction occurs and the material becomes a solid mass. In the present invention, the viscous material located in valve seat component 78 is heated to a temperature range just below the melting point of the catalyst, avoiding the cross link reaction. During the period of heating, the ratio of the viscous modulus to the elastic modulus decreases.

Figure 3:
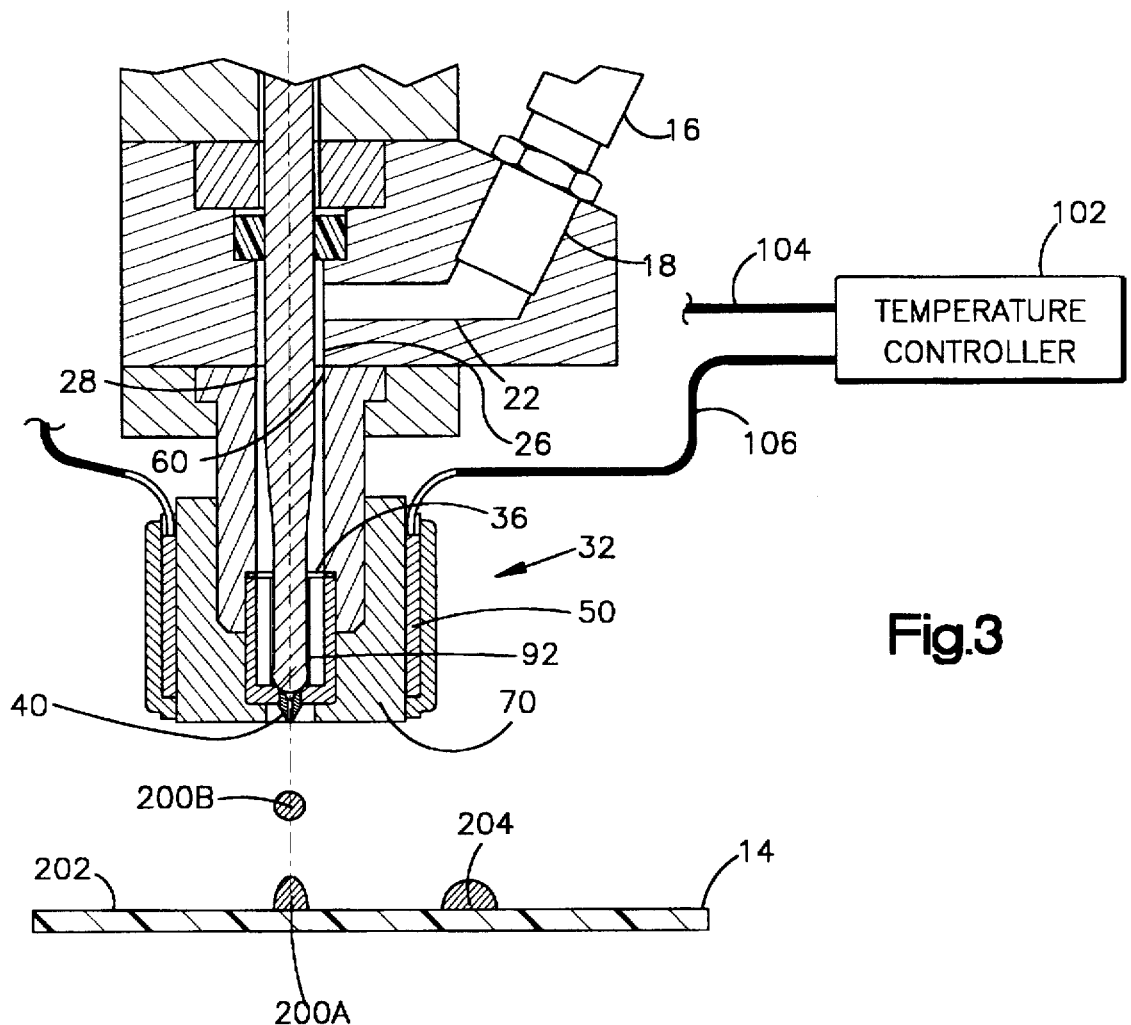
FIG. 3 is a side view in cross section of a liquid or viscous material dispensing apparatus disposed above a substrate, such as a PC board, dispensing a plurality of droplets onto a single location on the surface of the substrate.

While the method of the first embodiment for dispensing a droplet of liquid or viscous material from a nozzle, i.e., by pushing the material into a flow passage 36 under pressure and ejecting the material from the flow passage 36 by closing valve 92 against valve seat 38, is effective for dispensing a single droplet, the formation of droplets of a larger size is time consuming because the size of each droplet is typically controlled by varying the length of time the valve head 92 is retracted from valve seat 38. In accordance with a second embodiment of the invention, the time to form a droplet of a larger size is reduced by dispensing two or more droplets of the same size onto a single location on the surface of a substrate so that the droplets combine to form a single droplet of a larger size and desired shape. As shown in FIG. 3, the first droplet 200A of liquid or viscous material as described before, is dispensed onto the upper surface 202 of a substrate 14 with a first shape. Then a second droplet 200B is dispensed at the same location so as to fall on the first droplet 200A and combine therewith to form a final droplet 204 of a second shape typically having a larger diameter than the first droplet 200A by itself. While two droplets are described, it is within the terms of the invention to dispense three, four, or more droplets onto the same location.

The method of applying a plurality of successive droplets 200A, 200B to a single location to form a final droplet 204 of desired size and shape is advantageous, as compared to forming a similar sized droplet by simply allowing the valve head 92 to stay open, i.e., retracted from valve seat 38, for a longer period of time, because of a significant reduction in the amount of time required. For example, if a single droplet 200A of a given size is dispensed from the valve seat assembly 32 in 15 milliseconds (msec), a droplet which is four times as large would require 200 msec to be dispensed by the pressure in the syringe, i.e., about 10 pounds. If, on the other hand, four single droplets 200A are dispensed at the same location, each droplet is dispensed in 15 msec for a total of 60 msec to dispense a droplet which is four times as large as a single droplet. Accordingly, the apparatus 10, as shown in FIG. 3, can be programmed to dispense a plurality of droplets, i.e., two, three or four droplets, by rapidly retracting and then closing valve head 92 against valve seat 38 while apparatus 10 remains in a stationary location. Then, apparatus 10 can be moved by conventional means, such as a robot device to which it is mounted (not shown) to another location for applying a plurality of droplets onto another selected location. The result is the ability to program the apparatus 10 to rapidly dispense droplets of various shapes and sizes at any location on a substrate in any desired configuration.

Figure 4:
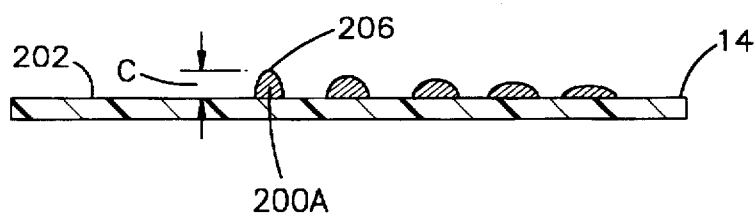
FIG. 4 is a side view of a substrate having droplets of varying height depending on the number and temperature of the droplets dispensed at a single location on the surface of the substrate.

Another aspect of the present invention relates to varying the height "c" of the top surface 206 of a droplet 200A of liquid or viscous material above the surface 202 of a substrate 14 onto which the droplet is dispensed. As shown in FIG. 4, the droplets of the liquid or viscous material, from left to right, are each representative of an increase in dispensing temperature of about 2° C as compared with the droplet directly to its left. As the temperature increases, the height "c" of the droplet of material being dispensed on the upper surface 202 of the substrate 14 is decreased. Also, as the temperature of the droplet increases, the profile of the droplet changes, i.e. the droplet of material being dispensed generally has a larger diameter, i.e. the top surface of the droplet is flatter and located closer to the upper surface 202 of the substrate 14. Prior to dispensing a large number of droplets, the temperature of the material being dispensed is set to obtain the desired height, as determined by empirical methods. The temperature can be controlled by the temperature controller 102 and heating element 50, as discussed hereinbefore. Then, the droplet of material at the desired temperature is dispensed onto the upper surface 202 of the substrate 14 so that the top surface 206 of the droplet is at the desired height "c" above the upper surface of the substrate.

It is also within the terms of the invention to dispense at least two of the droplets of liquid or viscous material at a predetermined temperature so that the two droplets fall on each other and combine at a single location on the upper surface 202 of the substrate 14 to form a final droplet having a second height above the upper surface of the substrate which is greater than the height of a single droplet. The height and profile of the final droplet is determined by the viscosity of the material and the temperature at which it is dispensed. As previously discussed, additional droplets of liquid or viscous material can be dispensed onto the same location to combine and form a final droplet with a greater height, as desired.

An additional embodiment of the present invention relates to the method of selectively applying spaced droplets of solder flux onto a PC board and then allowing the droplets to flow together into a uniform coating or film. Referring to FIG. 5, there is illustrated a PC board 300, also known as a mother board, having a plurality of electrical interconnections 302 shown on a top surface 304 of the board. The interconnections are surrounded by a perimeter line 306 which corresponds to the area of the board onto which a thin, uniform or film of flux material is to be applied. After the application of the flux material, as described in more detail below, a flip chip 308 having a large number of interconnect points with a small ball of solder 310 attached to each is soldered to the board 300. Flip chip 308 is disposed adjacent the PC board 300 so that the bottom surface 312 of chip 308 is facing upwards in the same direction as surface 304 of the board 300. Then, using automatic controls, chip 308 is flipped over so that the bottom surface 312 of chip 308 is disposed against the top surface 304 of board 300 with each of the solder balls 310 engaged against one of the interconnections 302 on the top surface 304 of board 300.

Figure 11:
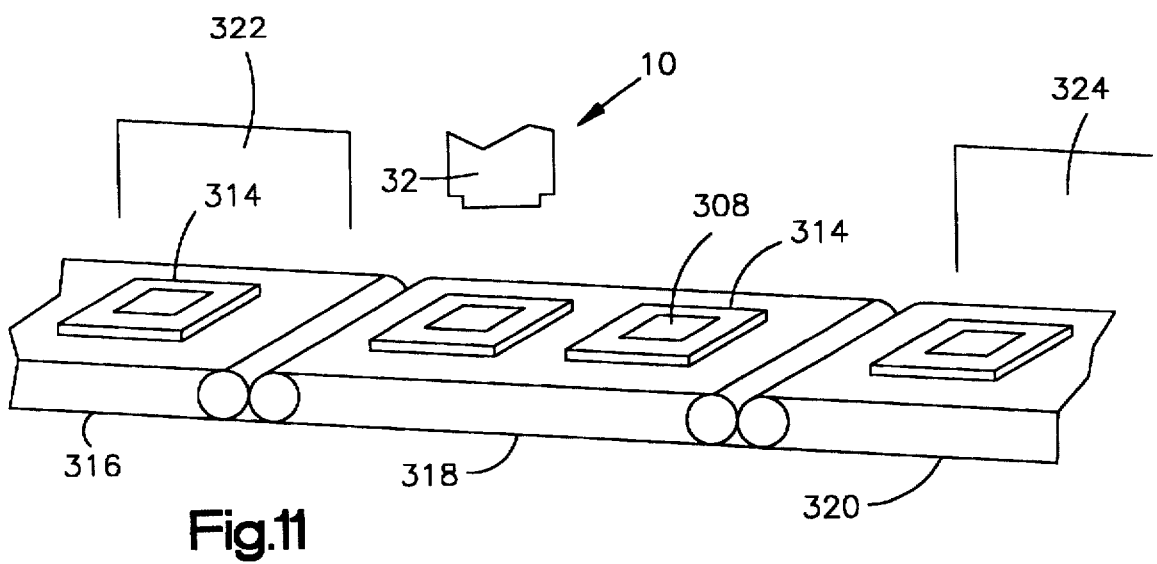
FIG. 11 is an illustration of a system for depositing flux soldering coating onto a PC board.

A typical system to apply the droplets of solder flux, such as a conveyorized Select Coat System, available from Nordson Corporation of West Lake, Ohio, is shown in FIG. 11. PC boards 300, each carried on a pallet 314, move down a series of adjacent conveyors 316, 318, 320. Each pallet 314 and board 300 initially move through a preheat zone 323 on conveyor 316 so that the board 300 is heated to a desired pre-heat temperature, typically between about 100° Fahrenheit (F) and about 200° Fahrenheit (F) and preferably between about 120° F. and about 130° F. Then the pallets 314 with their boards move onto an adjacent downstream conveyor 318 where the flux is applied as a series of droplets through a valve seat assembly 32 of a dispensing apparatus 10, as described hereinbefore.

The droplets 322 of solder flux are selectively applied at selective locations with the size of each droplet and the spacing between the droplets being selected so that the droplets flow together into a uniform coating or film. For example, as shown in FIGS. 5 and 6, the droplets 322 are applied to the area A on the board 300 with a dispersion, as shown in FIG. 6, so that the droplets flow together into a substantially uniform coating or film 326 as shown in FIG. 7. The exact size and spacing of each droplet which assure that the droplets flow together into a uniform film is dependent upon factors including: the composition and viscosity of the solder flux; the application temperature of the solder flux; and the temperature of the PC board 300. The quantity of droplets, the droplet size, the droplet spacing, and number of rows of droplets can be adjusted to achieve the desired area and thickness of coverage.

In the application of solder flux to a PC board, an important aspect of the invention is that the solder flux is applied in droplets of about 0.125 inches in diameter and of varied size so that the accurately dispersed droplets flow together, creating a uniform film of solder flux with excellent edge definition. Application thickness of between about 0.2 mils to about 5.0 mils is achievable with the application method of the present invention. In a typical application of the droplets to a PC board 300 onto which a silicon chip 312 is to be soldered, the thickness of the flux layer is between about 2.5 mils to about 3.5 mils. Since the solder balls are typically about 5 mils in diameter, the flux layer is selected to be about 2.5 mils and about 3.5 mils so that an air gap of about 2 mils extends between the surface 304 of board 300 and the bottom surface 312 of the chip 308. This spacing of the air gap prevents the creation of a flux support surface disposed against the bottom surface 312 of chip 308 which would interfere with the contact between the solder balls 310 and their corresponding interconnections 302.

After each board 308 is coated with the droplets of solder flux, it passes onto an adjacent downstream exit conveyor 320 to a chip placement machine (not shown). The solder flux being used in carrying out the present invention is typically a low solids, solder flux containing small amount of solids, e.g. five weight percent or less, and the remainder a solvent such as isopropanol or a similar type of alcohol, a vehicle, an activator, a surfactant and an antioxidant. Note that the non-atomized application of the solder flux is particularly advantageous because there is no masking or overspray. Also since the applicator does not contact the PC board, there is no damage to the PC board. In addition the automated system is faster and provides better quality applications than prior art manual applications or even other automated applications.

The conveyors 316, 318 and 320 can be simple, constant speed conveyors that move the printed circuit board 308 and pallet 314 beneath the dispensing head 32. Once located beneath dispensing head 32, further movement of PC board 308 is terminated while the dispensing head 32 proceeds through a flux applying routine, the movement of the head preferably being controlled by a microprocessor controller (not shown). For example, the dispensing head 32 is mounted on a robot that can operate in up to three axes of motion: X, Y, Z so that the dispensing head is moved above the PC board in a programmed pattern based on the configuration of the board and the shape of the film of solder flux which is to be applied. Typically, a controller (not shown) incrementally moves the dispensing head 32 over the stationary PC board 308 along a first axis (X) generally parallel to the conveyor line. Then, the actuator moves the dispensing head 32 laterally over the PC board 308 along a second axis (Y). The Z axis motion allows the dispensing head 32 to be positioned with respect to the printed circuit board. Because of the high rate of speed associated with the dispensing head 32 as it travels laterally across the board 308, the entire dispensing operation can still fall within accepted rates of PC board throughput speed (in excess of 1500 PC boards per hour) and remain compatible with commercially accepted rates of speed. Once the lateral travel of the dispensing head 32 is completed, the dispensing head is then incrementally advanced along the first axis to position the dispensing head over another selected work path of the PC board. This process is continued until the droplets of flux are dispensed over the desired portions of the board. While simple, constant speed conveyors are satisfactory for use with the present invention, it is also within the terms of the present invention to use more sophisticated conveyors that can incrementally feed the PC board through the flux station. For example, the PC board and pallet is moved in increments so that stationary, multiple passes of the dispensing head will dispense rows of droplets of the solder flux on the selected surface of the board. The dispensing head under this alternate arrangement need only be actuated in a lateral direction (along the second axis) since the relative motion between the board and dispensing head (along the first axis) is provided by the more complex and sophisticated conveyor system.

After the film 326 of flux has been properly applied, as shown in FIG. 7, the flip-chip 308 containing the balls of solder 310 is placed onto the board 300 as shown in FIG. 5. That is, chip 308 is placed on a PC board 300 by a robot operated mechanism (not shown) so that the bottom surface 312 of the chip disposed against the top surface 304 of the board and each of the solder balls 310 is engaged against a selected interconnection 302 on the top surface 304 of board 300. Then the two are heated in a reflow oven (not shown) where the solder softens and flows to interconnect the chip to the board. The flux cleans the solder and the carrier surface removing oxidation and ensuring proper connectivity and conductivity of the chip and board assembly.

Figure 8:
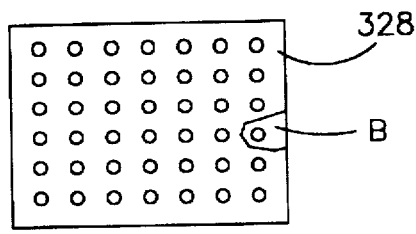
FIG. 8 is a top view of a printed circuit board having through holes.
Figure 9:
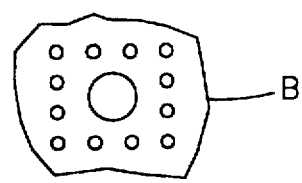
FIG. 9 is an enlarged view of section B of FIG. 8 illustrating a plurality of droplets applied about a through hole in the printed circuit board.
Figure 10:
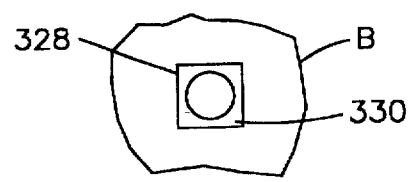
FIG. 10 is a top view of the area shown in FIG. 9 after the droplets of flux flow together to form a coating.

While the invention is described in terms of applying a film of solder flux to a printed circuit board for the application of a flip-chip, it is also within the terms of the invention to selectively apply flux to specific areas of a circuit board 328 with through holes, as shown in FIG. 8. Then the individual droplets of flux flow into each other to form a film or coating 330. The flux can be applied to a specific area such as area B, as shown in FIGS. 8 and 9. This is advantageous since only selected through holes have electrical leads (not shown) to be soldered extending therethrough.

While the invention has been described in terms of applying solder flux or an adhesive to a printed circuit board, it is also within the terms of the invention to apply dots or droplets of flux or surface mounting adhesive in the manufacture of electronic components such as attaching flip chips to a PC board.

Figure 14:
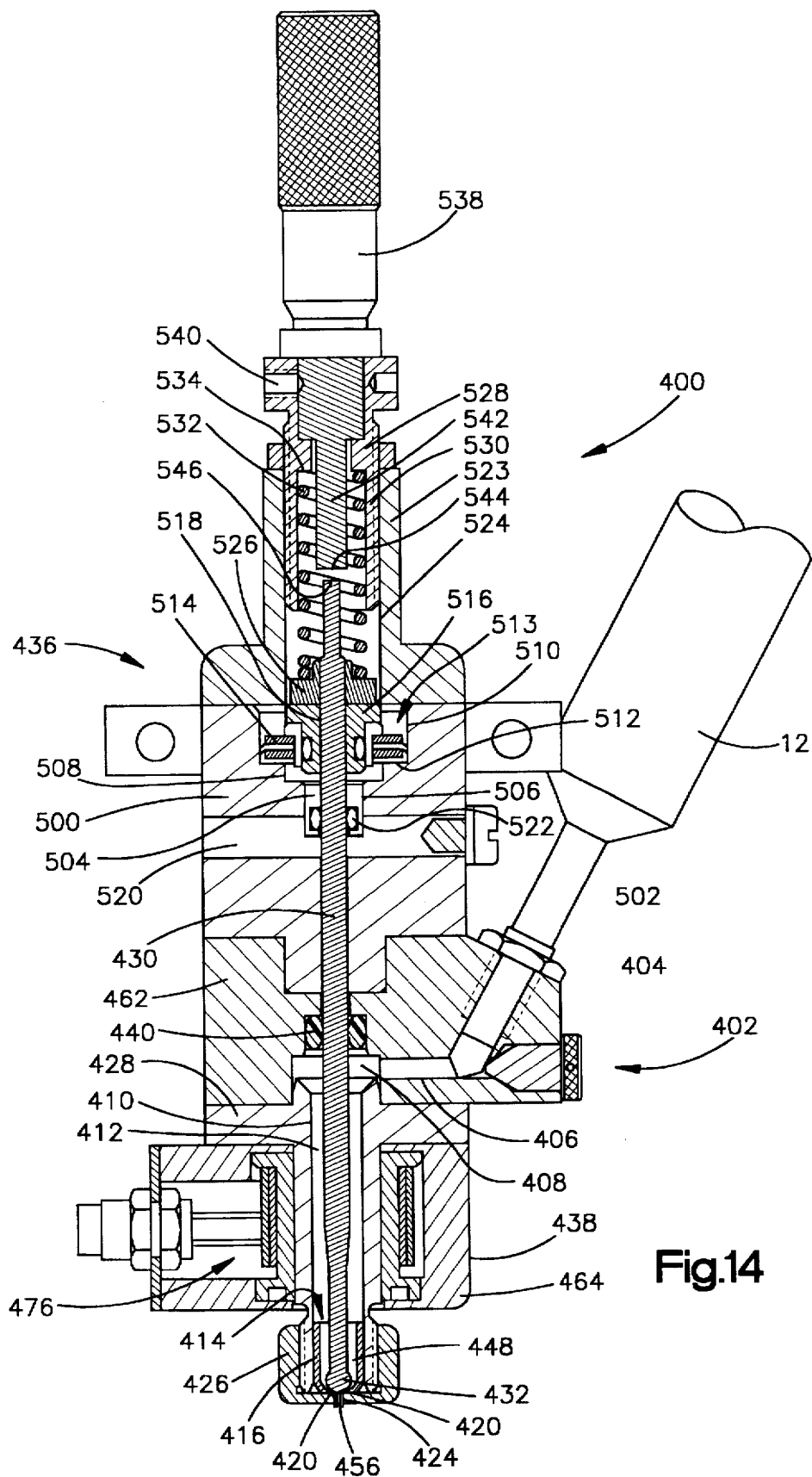
FIG. 14 is a view, in cross section, through line 14—14 of FIG. 13 showing the second embodiment of a liquid or viscous material dispensing apparatus in accordance with the invention.

While the first embodiment of the dispensing apparatus 10 operates effectively for dispensing small amounts of liquid or viscous material, a second embodiment as shown in FIG. 13 and 14 includes additional improvements described herein below. Dispensing apparatus 400 is used for dispensing small amounts of liquid or viscous material such as flux or surface mount adhesive from a standard, commercially available liquid or viscous material filled syringe 12 onto a substrate, such as a printed circuit board as previously described. Dispensing apparatus 400 includes a dispensing housing 402 with an inlet 404 connected by a bore 406 to an inlet chamber 408. Inlet chamber 408 is disposed above a flow bore 410 forming a flow passage 412. Within a lower end 414 of flow passage 412 is disposed a tubular valve seat assembly 416 which is secured by means such as press fitting and soldering within the outlet section 414. The tubular valve seat assembly 416 has a flow passage 418 extending therethrough with a valve seat 420 disposed about an outlet opening 422 extending through the closed lower end of the tubular seat assembly 416. The inlet end of flow passage 418 is in flow communication with the flow passage 412 of the flow bore 410 and the opposite outlet opening 422 is in flow communication with a nozzle 424 which is mounted by a nozzle cap 426 secured to the lower end of an elongated heated extention element 428 that forms a lower portion of the dispensing housing 402.

A valve shaft 430 extends through inlet chamber 408, flow bore 410, and into the flow passage 418 of valve seat assembly 416. Valve shaft 430 has a lower end 432 which sealingly engages valve seat 420 to close the outlet opening 422. The upper portion of valve shaft 430 is disposed within a control mechanism 436 that is mounted onto dispensing housing 402. Control mechanism 436 reciprocates valve shaft 430 out of and into seating engagement with valve seat 420. Also, according to the invention, a heater assembly 438 is disposed about the heated extension element 428 and removably secured thereto to heat the liquid or viscous material within the flow passage 412 as discussed in more detail below.

Dispenser housing 402 includes a generally horizontal bore 406 connecting inlet 404 to inlet chamber 408 through which valve shaft 430 is reciprocally received. A seal device 440, such as a conventional U-cup spring seal, is disposed in sealing relation about shaft 430 and is located above chamber 408 to ensure that the viscous or fluid flowing through chamber 408 and into flow bore 410 does not leak around the shaft and into the control mechanism 436. As shown in FIG. 15, valve seat assembly 420 is generally a cup-shaped body with an opened upper end, a closed lower end, and an outlet opening 422 extending through the closed lower end and having a valve seat 440 thereabout. At the lower end 442 of valve shaft 430 is a generally hemispherical shaped head 444 which is mated to seat against the valve seat 440. While a generally hemispherical shaped valve head 444 is disclosed, it is also in terms of the invention to use other shaped valve heads as desired. The size of the ball and seat is selected to form different sized dots of the material being dispensed. The nozzle assembly 424 (see FIG. 16) includes a nozzle cap 426 that is typically threaded and formed of brass or stainless steel and an elongated nozzle 446 secured within a bore 448 through the closed end 450 of nozzle cap 426. The nozzle 446 is typically constructed of a tube with an inside diameter of about 0.004 to about 0.016 inches. The tube can be constructed of stainless steel material and is mounted within the bore 448 so that its upper end 452 is flush with the inner bottom surface 454 of the nozzle cap 426. The opposite end 456 extends past the outer bottom surface 458 of nozzle cap 426. Note that the valve head 444 is spaced from the end 452 of nozzle 446. The nozzle 446 is secured within the bore 448 by pressing it into the bore and gluing, laser welding or brazing it into place. While a stainless steel tube, as described above, is preferred for constructing the nozzles, it is also within the terms of the present invention to substitute a conventional hot melt nozzle constructed of a brass holder with a stainless steel insert that is typically swaged into place, such as hot melt nozzle Part No. 237216 available from the Nordson Corporation of Westlake, Ohio, the assignee of the present invention. The nozzle holder assembly 424 is mounted onto the end of the heated extension element 428 so that the bottom inner surface 454 of the nozzle cap 426 is pressed against the bottom surface 460 of the extension 428. This prevents the liquid or viscous material being dispensed from leaking between the interface of the heated extension element 428 and the bottom inner surface 454 of nozzle cap 426.

Referring to FIGS. 14 and 15, heating assembly 438 is disposed about the heated extension element 428 and secured thereto by conventional means such as a plurality of screws (not shown). The heating assembly 438 includes a heater housing 464 with a stepped inner bore 466 extending between a top outer surface 468 and a bottom outer surface 470. A side bore 472 extends from a side wall 474 of heater housing 464 to the stepped inner bore 466. A heating element 476 is disposed within the stepped inner bore 466 and includes a spool 478 typically constructed of a heat transfer material such as aluminum and has a throughbore 480 which is slidably and removably mounted onto the outer surface 482 of the heated extension element 428. A thermal foil resistance heater 484 is wrapped about the outer surface 486 and secured in place by a epoxy 488 on either side of the heater 484. A plate 490 closes the opening to side bore 472 and has a conventional bulk head electrical connecter 492 mounted thereon. Two sets of two wires each 494 and 496 connect the thermo resistance heater 484 to the bulk head electrical connector 492 to control the temperature and to power the thermo resistance heater. A wire cable (not shown) connects the electrical connector 492 to temperature controller, as disclosed in the first embodiment.

An important feature of the construction of the heating element 462 as compared to the heating element 50 as provided in the first embodiment of the present invention, as seen in FIG. 2, is the ease of separating the heating assembly 462 from the heated extension element when the nozzle assembly 424 and the heated extension element 428 are removed for purposes of cleaning. The removal can simply be accomplished by unscrewing the threaded nozzle assembly 426 from the heated extension element 428. Then, the heated extension element can be unscrewed from the dispensing housing 402, typically by removing the screws (not shown) extending through the heated extension element and into the dispensing housing. Next, the heating assembly 462 can be slid off of the outer surface 480 of the heated extension element without straining the wires to the heater control as was sometimes the problem with the first embodiment. It is important to remove the heating assembly 462 from the heated extension element 428 in order that the heated extension element can be submerged in a solvent to clean off any of the liquid or viscous material which might have accumulated thereon. The solvent should not contact the heating element 476 as it can dissolve the epoxy and ruin the thermal resistance heater 484. When necessary, the spool 478 can be removed from the heater housing 464 through the opening of bore 466 at the top surface 468. The spool 478 is held in place by a slight interference fit between tabs 498 which are disposed about the upper end of bore 466 and spool 478.

Another modification of the first embodiment relates to the control mechanism 436, as shown in FIG. 14, for reciprocating valve head 432 between a first position (not shown) spaced from valve seat 420 and a second position (as shown in FIGS. 14 and 15) in seating engagement with valve seat 420. The second position is the default position because the liquid or viscous material collects in the flow passage 412 and is heated to a preset temperature by the heating element 476, as discussed below. As seen in FIG. 14, the control mechanism 436 includes a housing block 500. An axially disposed longitudinal bore 502 extends through housing block 500 and is co-axially disposed about the valve shaft 430 when the dispensing unit 400 is assembled. Valve shaft 430 extends through bore 502 and projects from the upper end of the bore into a stepped bore chamber having a lower bore 506 which intersects a middle bore 508, which in turn, intersects an upper bore 510 having a larger diameter than the middle bore 508 to form a stop surface 512. An air actuated piston 513 with a cylindrical seal element 514, which is substantially identical to the cylindrical seal element 118 in the first embodiment, is mounted onto a support structure 516 which in turn has a central bore 518 through which valve shaft 430 extends and is attached thereto. Piston 513 reciprocates in bore 510 and forms an air chamber 507 in the air of bore 510 below the piston. An air inlet 520, extending through the housing block 500 and transverse to the bore 502, is connected to a source of pressurized air (not shown). An air solenoid 515 shown in FIG. 13, is mounted onto the front of the dispensing apparatus 400 and receives air from bore 520. The solenoid 515 controls the air flow into the air chamber 507 to control the air flow below the air piston 513 and air seal 514, which is substantially identical to that shown in FIG. 1 of the first embodiment. A seal 522, identical to seal 522 is disposed about valve shaft 430 and is located in lower bore 506 between bore 502 and middle bore 508 to prevent air leakage into upper bore 510 which would affect the movement of valve shaft 430.

A spring housing 523 is mounted against the top surface of housing block 500 and is formed with a central bore 524. A spring retainer 526 is securely mounted onto the upper end of valve shaft 430 and is biased against support structure 516. A cup shaped spring adjustment component 528 is threadably secured to spring housing 522 and has an elongated stepped bore 530 extending therethrough. A compression spring 532 extends between spring retainer 526 and a surface 534 formed at the intersection of two portions of bore 530 having different diameters. A lock nut 536 is threadably secured to spring adjustment component 528 by threads so that the component can be locked into position closer to or further away from spring retainer 526. The compression of spring 532 is increased as the spring component 528 is moved towards spring retainer 526 and decreased as the spring component 528 is moved away from the spring retainer.

As discussed with regard to the first embodiment, the closure force exerted by compression spring 532 on spring retainer 526 and through valve shaft 430 to valve head 432 must be carefully adjusted to provide a desired closure force, typically about 13 to about 17 pounds.

Another feature of the present embodiment is the inclusion of a conventional micro adjustment device 538 which is mounted into the upper bore 530 and secured in place by conventional means such as a set screw 540. The micro adjustment device 538 has a cylindrical extension element 542 with a bottom surface 544 that is normally spaced from the upper end 546 of valve shaft 430. The distance between the bottom surface 544 of the extension element 542 and the upper end of the valve shaft 430 is critical to control the position of valve head 432 away from valve seat 420 when fluid is being dispensed through nozzle assembly 424.

To further appreciate the advantages of the embodiment shown in FIGS. 14 and 15, a description highlighting the differences with the first embodiment shown in FIG. 1 follows. A pressurized syringe 12 of liquid or viscous material, typically flux or surface mount adhesive, is disposed in the inlet opening 404 to force the liquid or viscous material into bore 406 and to then flow into inlet chamber 408 and down flow passage 412 to fill the flow passage 418 within the tubular seat assembly 416 with a small amount of the liquid or viscous material while the valve head 432 is seated against valve seat 420. The heated extension element 428 is formed of a heat conducting material, such as brass, to transfer heat from the heating element 462 which is disposed about the heat extension element 428 to heat the liquid or viscous material within the flow passage 412. The temperature to which the liquid or viscous material is heated and controlled is dependent upon the specific material being dispensed by the dispensing apparatus 400. An example of a typical temperature range is discussed herein before. The opening and closing of the valve head 432 against the valve seat 420 together with fluid pressure supplied by syringe 12 causes the viscous material to be pushed through and out from the orifice through nozzle assembly 424 as a thin stream. As discussed in greater detail above, the impact of the valve head 432 closing against valve seat 420 causes a sudden deceleration of the flowing material and a breaking of the stream into droplets. The heating of the liquid or viscous material is accomplished within the flow passage 412 and within the tubular seat assembly 416 due to the conduction of the heat through the metal body of the heated extension element.

The opening of the valve by retracting valve shaft 430 and valve head 432 from seat 38 is accomplished with pressurized from air solenoid into the air chamber below the air piston 514. The air piston which is secured to the valve shaft 430 by the support structure 516 moves in a direction away from valve seat 420 against the force of the compression spring 532 a distance set by the space between the bottom surface of the micro adjustment 538 and the upper end 546 of valve shaft 430. The micro adjustment allows this spacing to be accurately controlled depending on the size of the droplets required.

The closing of the valve head 432 against the valve seat 420 must occur in a very short period of time, i.e., less than about 22.6 milliseconds and preferable less than about 10.3 milliseconds. The air in the air chamber 504 below the air piston 514 is exhausted through an exhaust passage (not shown) into air solenoid 515. Simultaneously, the compression spring 532 moves valve head 432 rapidly to a seated position against valve seat 420. In the same manner as in the first embodiment, the impact force of the closing of valve head 432 against seat 420 breaks the stream of liquid or viscous material dispensed from nozzle 456 to form a droplet of the material.

Figure 17:
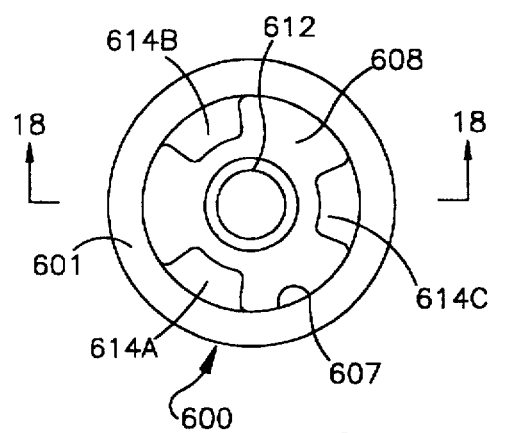
FIG. 17 is a top view of an alternative valve assembly.
Figure 18:
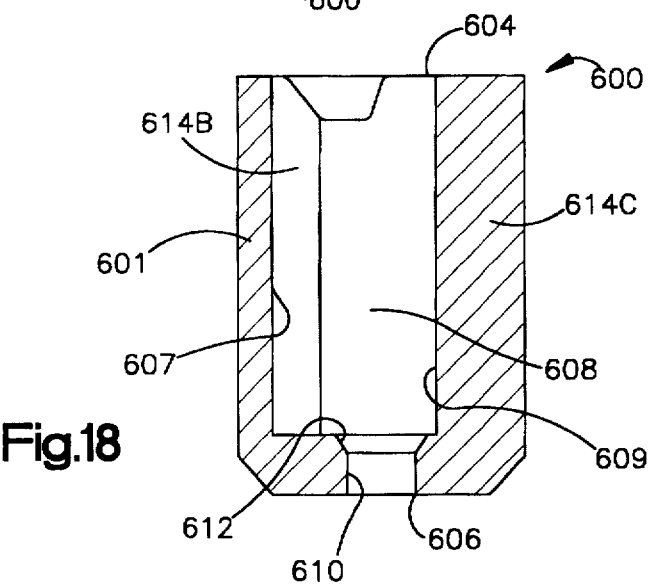
FIG. 18 is a cross sectional side view along line 18—18 of FIG. 17.
Figure 19:
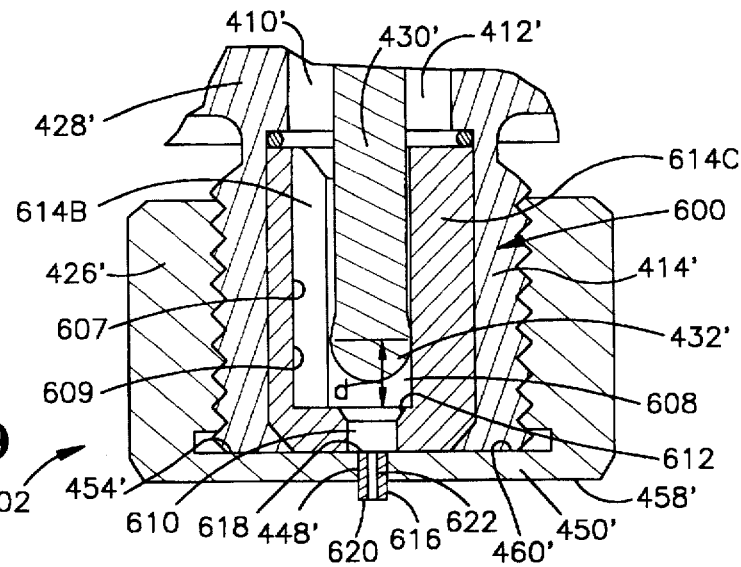
FIG. 19 is a cross sectional side view of the alternative valve assembly shown in FIG. 18 containing a valve in a first position and mounted within an elongated extension element having a nozzle cap secured to the lower end thereof.
Figure 20:
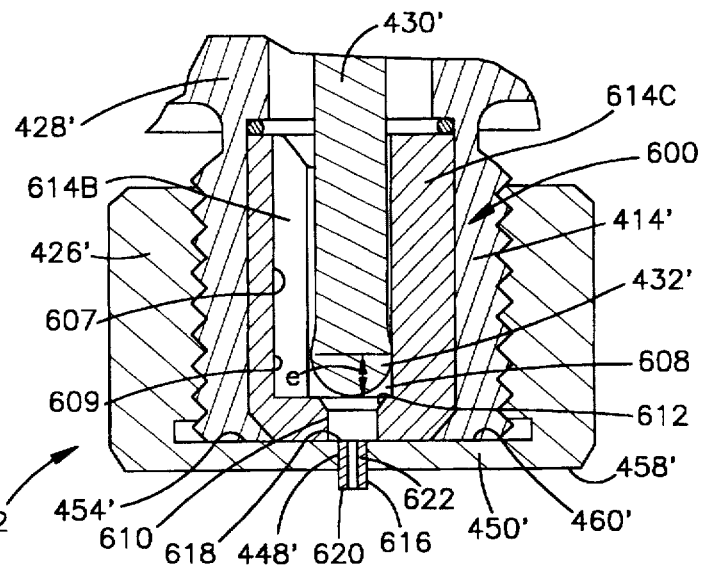
FIG. 20 is a cross sectional side view of the alternative valve assembly shown in FIG. 18 containing a valve in a second position and mounted within an elongated extension element having a nozzle cap secured to the lower end thereof.
Figure 21:
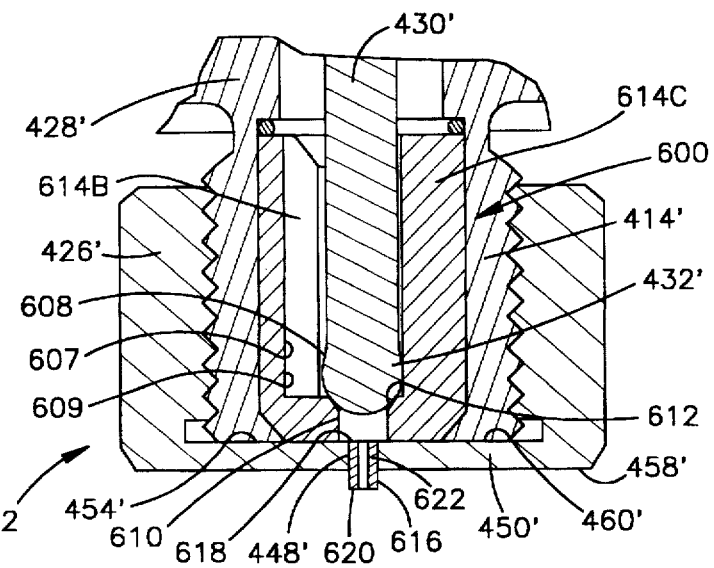
FIG. 21 is a cross sectional side view of the alternative valve assembly shown in FIG. 18 containing a valve in a third position and mounted within an elongated extension element having a nozzle cap secured to the lower end thereof.

While the second embodiment of the dispensing apparatus 400 operates effectively for dispensing small amounts of liquid or viscous material, further improvements have been made to the tubular seat assembly 416 and the nozzle assembly 424 of the second apparatus 400. Referring to FIGS. 17 and 18, there is illustrated a modified tubular seat assembly 600 which can substituted for the tubular seat assembly 416 of the second apparatus 400. FIGS. 19, 20, and 21 show a modified nozzle assembly 602 which can substituted for the nozzle assembly 424 of the second apparatus 400.

Referring to FIGS. 17 and 18, tubular seat assembly 600 is constructed of a tubular shaped element 601 having an inlet end 604, an outlet end 606 and a stepped axial bore 607 forming a flow passage 608 extending therethrough. The stepped axial bore 607 includes an upper bore wall 609 having a first diameter and a lower bore wall 610 having a second diameter which is smaller than the first diameter. A valve seat 612 is disposed at the intersection of upper bore wall 609 and lower bore wall 610 and is located closer to outlet end 606 than to inlet end 604. A plurality of elongated guides 614A, 614B, 614C are formed integrally with the first bore wall 609 of tubular seat assembly 600 and project inwardly into the flow passage 608 to support valve head 444' as it reciprocates within tubular seat assembly 600. Throughout the specification, primed numbers represent structural elements which are substantially identical to structural elements represented by the same unprimed number. While three elongated guides 614A, 614B, 614C are illustrated, it is within the terms of the present invention to use a different number of guides of any desired shape. Referring to FIGS. 19, 20, and 21, tubular seat assembly 600 is shown assembled and secured by means such as press fitting and soldering within the outlet section 414' of extension element 428'. The inlet end 604 of flow passage 608 is in flow communication with the flow passage 412' of the flow bore 410' and the opposite outlet opening 606 is in flow communication with nozzle assembly 602 that is shown threadably secured onto the extension element 428'.

The nozzle assembly 602, as illustrated in FIGS. 19, 20, and 21, includes a nozzle cap 426' that is typically internally threaded and formed of brass or stainless steel. An elongated nozzle 616 is secured within a bore 448' through the closed end 450' of nozzle cap 426'. Nozzle 616 is a cylindrical tube having an elongated orifice 622, typically constructed of stainless steel material, and is mounted within the bore 448' of nozzle cap 426' so that upper end 618 of the nozzle is flush with the inner bottom surface 454' of the closed end 450'. An opposite lower end 620 of nozzle 616 extends past the outer surface 458' of nozzle cap 426'. The nozzle 616 is secured within the bore 448' in a manner such as pressing it into bore 448' and laser welding, gluing or brazing it into place so that the inner surface, i.e. elongated orifice 622, of nozzle 616 is not damaged. The nozzle 616 is typically constructed of a thin walled tube with an outside diameter of about 0.012 to about 0.050 inches and a length of about 0.020 to about 0.100 inches. The elongated orifice 622 typically has a diameter of between about 0.002 to about 0.016 inches. The elongated orifice 622 has a ratio of length to diameter of up to about 50 to 1, preferably of at least about 25 to 1, and most preferably of at least about 3 to 1. The end 620 of nozzle 616 and the elongated orifice 622 opening to end 620 is preferably coated with a low energy surface coating comprising a polymer such as Teflon, silicone, or a ceramic. The low energy surface coating functions to improve fluid flow through elongated orifice 622 and to reduce the amount of fluid which clings on the surface of end 620. Furthermore, the coating has a surface tension which resists wetting by the material hanging from the end of the nozzle, which in turn causes the string to have a smaller diameter and form a smaller droplet. This effect could also be achieved with a polished surface finish on end 620 or constructing nozzle 616 completely of plastic. The tubing used to construct nozzle 616 has a thin wall because the material being dispensed from the nozzle adheres to the lower end 620 to cause the stream of material being dispensed from the nozzle to have a diameter substantially equal to the outer diameter of the nozzle.

The nozzle assembly 602 is mounted onto the end of the extension element 428' so that the bottom inner surface 454' of the nozzle cap 426' is pressed against the bottom surface 460' of the extension element 428'. This prevents the liquid or viscous material being dispensed from leaking between the interface of the extension element 428' and the bottom inner surface 454' of nozzle cap 426'.

Referring again to FIGS. 19, 20, and 21, a valve shaft 430' extends into the flow passage 608 of valve seat assembly 600. Valve shaft 430' has a valve 432' at one end which sealingly engages valve seat 612 to close the outlet opening 606 of valve seat assembly 600, as shown in FIG. 18. The upper portion of valve shaft 430' is disposed within a control mechanism 436, as previously discussed. Control mechanism 436 reciprocates valve shaft 430' and valve 432' out of and into seating engagement with valve seat 612. Valve 432' has first position spaced a distance "d" from valve seat 612, as shown in FIG. 19, a second position "e", as shown in FIG. 20, spaced closer to valve seat 612 than first position "d" and a third position in seating engagement with valve seat 612, as shown in FIG. 21. The first position "d" is located about 0.050 inches from valve seat 612. The second position "e" is located at a distance of less than about three times the diameter of nozzle orifice 622 and preferably a distance less than about 1.5 times the diameter of nozzle orifice 622. That is the second position is less than about 0.036 to about 0.150 inches from valve seat 612 and preferably is less than about 0.003 to about 0.024 inches from valve seat 612.

Based on testing of the dispensing apparatus 400 equipped with the modified tubular seat assembly 600 and modified nozzle assembly 602, it is believed that the successful operation of the dispensing apparatus is a delicate balance in achieving the successful effect of breaking off the stream of viscous material dispensed from nozzle 616 into a dot and the unsuccessful effect of breaking the stream into multiple pieces resulting in satellites, splattering, or atomization. Through testing, it has been determined that the dot of liquid or viscous material is actually formed as a string or column of liquid or viscous material dispensed from the outlet end 620 of nozzle 616. This string breaks when the forces on it, generated by the rapid closing of valve 432' against seat 612, exceeds its strength. It is important to break the string of liquid or viscous material extending from the outlet end 620 of nozzle 616 without forming fibers or shattering the string so that it breaks in multiple locations. In some circumstances, the string can be broken at one or two locations and still form an acceptable dot since the second and/or third pieces are right behind the first and/or second pieces so that they meld together. Nonetheless, this type of behavior should be minimized because it can result in satellites.

The dispensing apparatus 400 operates by building up pressure on the flow of liquid or viscous material being delivered upstream of nozzle 616, to accelerate the flow into a stream being dispenser from nozzle 616, and to then quickly close the valve 432' against seat 612 to decelerate the stream, and create the force to break the stream into a droplet of material. Thus, there exists a complex, dynamic balance of shear flow forces in the nozzle and elongational flow forces in the extruded stream. The rates at which these forces are created are beyond any available measurement techniques.

Figure 22:
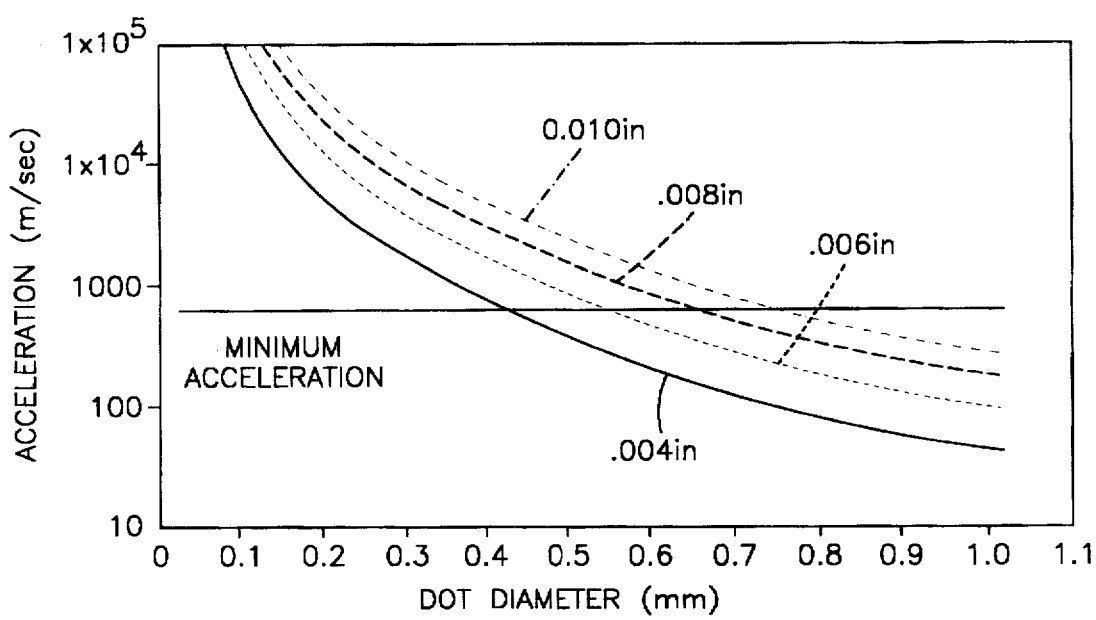
FIG. 22 is a graph which shows acceleration of a valve to produce a dot.

A basic model, developed to analyze dot breakage, results in an estimate of 600 meters/sec$^2$ to break a dot, as a minimum value. This model is a simple balance between the yield stress (strength) of the string and the inertial forces due to the deceleration and mass of the string. The model is based on the assumption that the elongational yield stress is three times the shear yield stress, which would be true for a purely viscous material. The model is developed using the following assumptions.

d=Diameter of dot
r=radius of dot=d/2
c=diameter of a string
h=length of string h(d,c)=4r (d)$^3$/6r (c)$^2$
$\rho$=adhesive density 1×gm./cm$^2$
$\sigma$=adhesive yield stress=500×3Pa (Pascal)
M=mass of string M(d,c)=$\rho$×$\pi$pr(c)$^2$×h(d,c)
F(c)=force required to break $\sigma_y$×$\pi$×r(c)$^2$
a(d,c)=acceleration required to generate force F(c)/M(d,c)
When the diameter d of the dot to be analyzed is 0.020 inches
c=0.006 inches
h=0.074 in.
M(d,c)=3.432 ×10$^{-5}$ gm
F(c)=2.736 ×10$^{-5}$ kg m sec$^{-2}$
a(d,c)=797 m/sec$^2$ In the same manner, the above parameters were calculated for a range of dot diameters from 0.008 to 0.040 in. The results are shown on a graph in FIG. 22.

Figure 23:
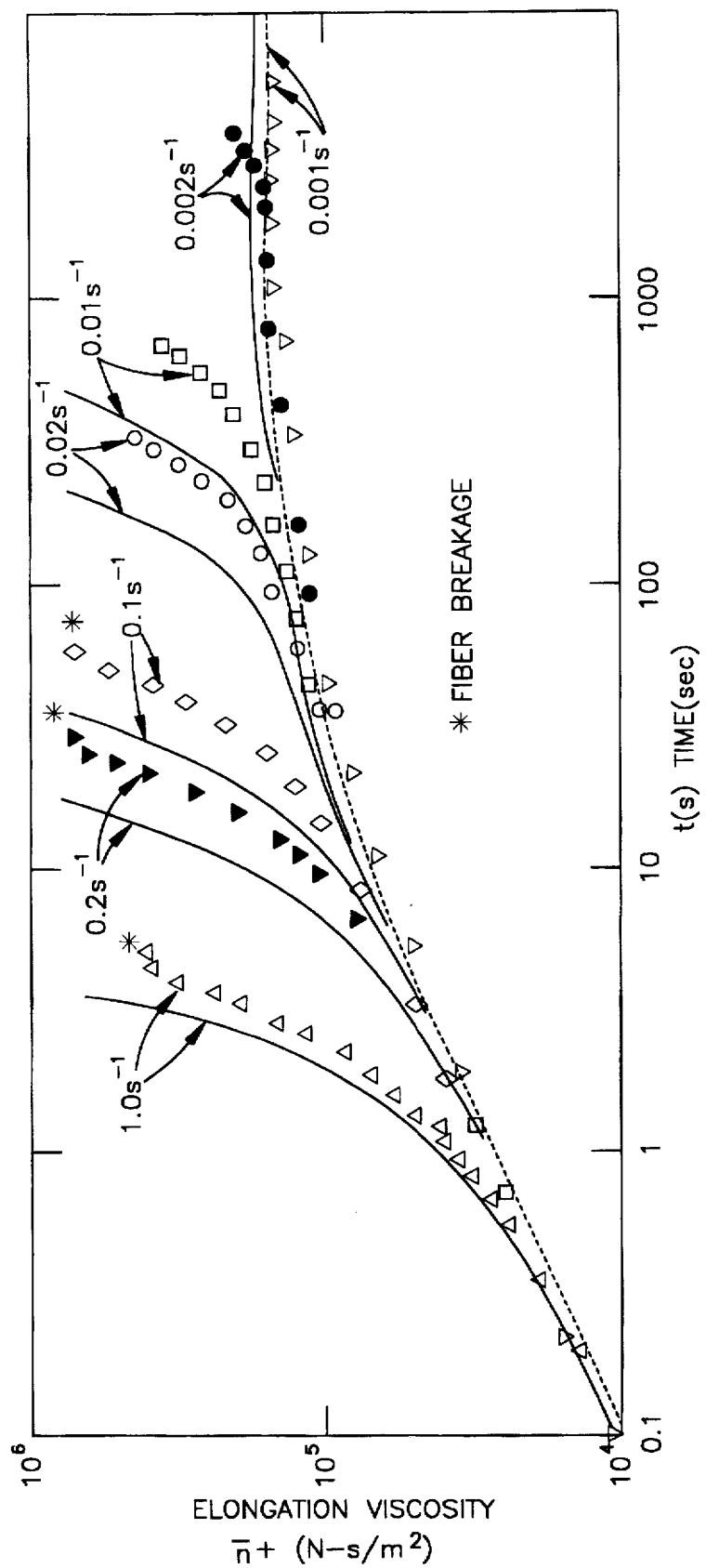
FIG. 23 is a graph which shows typical elongational behavior of a viscous material.

FIG. 23 is a graph which shows more typical elongational behavior which will result in higher acceleration estimates because at very low (0.001 s$^{-1}$) elongation rates, elastic contributions are negligible, and the elongational viscosity is .3 times the shear viscosity. At higher rates the elongational strength (viscosity at fiber breakage point) is several times higher than 3.

To develop the required accelerating and decelerating flow requires a complex shear flow through the dispensing device. The valve 432' initially accelerates downward from first position "d", spaced furtherest from the valve seat 612, to the second position "e". This distance allows valve stem 430' to accelerate to the required velocity before a significant quantity of material exits the nozzle 616. The forward velocity of valve 432' must be at least about 50 cm/sec and preferably at least 80 cm/sec and most preferably over 100 cm/sec to create a localized high pressure at the valve 432'. The liquid or viscous fluid can either move back to the inlet end 604 of tubular shaped element 601, that is towards the source of the liquid or viscous material, or towards outlet end 606. Although the source is under pressure, i.e., about 10 psi, the effect of flow area (the annular region between valve stem 430' and the walls of flow bore 607) being much larger than the flow area across 612 is to cause most, i.e. about 90, of the material to flow back towards the source. For example, computational fluid dynamic simulations have shown that the velocity of the fluid flowing back towards the source is about 70 cm/sec while the velocity of the fluid in the nozzle is about 10 cm/sec. As the valve 432' moves closer to the second position, i.e., about 1.5 to about 3 nozzle diameters from seat 612, the area available for flow between valve 432' and the seat becomes more and more restricted. During this stage of operation, the velocity of the fluid flow through the nozzle 616 increases to about 20 cm/sec and the pressure drop in the seat area is about 70 psi. As the valve 432' moves closer and closer to seat 612, the fluid flow between the valve and the seat becomes more restricted. This in turn reduces the amount of fluid flow, i.e. about 75%, returning to the source and causes an increase in the flow rate out the nozzle 616 to about 20 cm/sec. After valve 432' passes through the second position "e" towards the valve seat 612, there is now a major flow restriction between the valve 432' and seat 612 which in turn causes a flow velocity approaching 100 cm/sec and a pressure drop of about 500 psi between the valve 432' and the seat 612. At this stage, the flow in nozzle 616 has accelerated to about 30 cm/sec. In this analysis, the velocities are primarily a function of the geometry and the velocity of valve 432' and valve actuator 430' and are nearly independent of the specific material. The pressure drop estimates are directly related to the fluid viscosity model chosen. These estimates are based on a model where viscosity (Poise)=661+3725/shear rate. This is typical of many epoxy materials applied with the dot gun. Once valve 432' seats against valve seat 612, it immediately stops displacing material, and closes flow passage 608 to prevent material flow from the source. The liquid or viscous material in nozzle 616 stops flowing immediately. If the string of liquid or viscous material outside nozzle 616 is moving at 30 cm/sec and a portion of it stops in 0.1 milliseconds, the acceleration is over 600 m/sec$^2$. This is much higher than the estimate of 3,000m/sec$^2$ set out in the basic model discussed before. While there is no definite proof that material stops in 1 ms, 0.1 ms, or 0.01 ms, it is believed that 0.1 ms is a reasonable estimate.

The key variables influencing the acceleration and deceleration of the dot, and thus the forces on the dot, are the following:

a) The mass of the dot being formed, which is set by the fluid density and dot size;

b) The diameter of the stream formed, which is set by the wetted area at the nozzle tip;

c) The pressure developed by the valve, which is set by the diameter of the valve, the velocity, and the fluid viscosity;

d) The pressure drop in the nozzle orifice which is set by the length and diameter of the orifice;

e) The pressure drop from the valve back to the source, which is set by the length of the annular region between the stem and housing, the diameter of the stem, and the diameter of the housing; and f) The pressure drop between the valve and the seat as a function of valve position, which is set by the valve diameter and the seat diameter.

It is apparent that there has been provided in accordance with this invention apparatus and methods for dispensing small droplets of liquid or viscous material that satisfy the objects, means and advantages set forth hereinbefore. According to the invention, a method and apparatus for dispensing small amounts or droplets of liquid or viscous material is accomplished by initially heating small portions of the liquid or viscous material prior to dispensing the material through an elongated orifice of a heated nozzle. Then, rapidly closing a valve against a seat to simultaneously displace a desired amount of liquid or viscous material from the orifice and to break off a droplet of the material from the orifice by the energy imparted to the material by the closing of the valve against the valve seat. Another embodiment of the invention relates to a method for varying the number of droplets of a liquid or viscous material dispensed through an elongated orifice of a nozzle onto a substrate by causing at least two of the droplets to fall on each other and combine to form a final droplet of a desired shape on the substrate. An additional embodiment of the present invention relates to a method for varying the height of the top surface of one or more droplets of liquid or viscous material above the surface of a substrate onto which the droplet is dispensed by setting the temperature of the nozzle heater. Still another embodiment of the invention relates to a method for selectively applying a plurality of droplets of flux onto the surface of a substrate such as a PC board so that the droplets of flux flow together to form a uniform film of desired size and thickness. A further embodiment of the invention relates to dispensing apparatus with a heater assembly removably attached to the dispenser housing for easy removal when cleaning the dispensing section and nozzle of the apparatus. An additional embodiment of the invention relates to a modified seat assembly wherein the valve has three positions with respect to the valve seat and a modified nozzle assembly wherein the nozzle is constructed of a thin walled tube and can be coated with a plastic.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

We claim:

1. A method of varying the size of a droplet of a liquid or viscous material deposited on a substrate, said method comprising the steps of:

dispensing a stream of said liquid or viscous material through an outlet end of an orifice of a nozzle with a valve;

stopping the stream of the liquid or viscous material by closing the valve so that the stream breaks away rapidly from the nozzle to form a droplet of a first size;

forming at least two droplets of the first size of said liquid or viscous material when said stream of said liquid or viscous material breaks away from said nozzle; and forming a final droplet of a second size by causing said at least two droplets to fall on each other and combine.

2. The method of claim 1 further including the step of locating said orifice of said nozzle adjacent to a substrate surface so that said at least two droplets of said first size fall on each other and combine at a single location on said substrate surface to form said final droplet of said second size.

3. The method of claim 2 further including the step of heating said liquid or viscous material to a temperature at which said final droplet of said second size being dispensed onto said substrate is located at a first height above said surface of said substrate.

4. The method of claim 1 further including the step of dispensing said stream liquid or viscous material through said outlet end of an orifice having a ratio of length to diameter of at least about 3 to 1.

5. The method of claim 3 including the step of dispensing at least two of said droplets of liquid or viscous material whereby said at least two droplets of said first height fall on each other and combine at a single location on said surface of said substrate to form a final droplet having a top surface at a second height above said surface of said substrate greater than said first height.

6. A method of depositing a layer of liquid or viscous material on a substrate, said method comprising the steps of:
dispensing a stream of said liquid or viscous material through an outlet end of a nozzle with a valve;
stopping the stream of the liquid or viscous material by closing the valve so that the stream breaks away rapidly from the nozzle to form a droplet;
forming a plurality of the droplets of said liquid or viscous material when said stream of said liquid or viscous material breaks away from said nozzle; and
depositing said plurality of droplets onto said substrate at spaced, selective locations so that said plurality of droplets flow together into a uniform coating.

7. The method of claim 6 wherein said step of dispensing said liquid or viscous material includes dispensing a solder flux.

8. The method of claim 7 wherein said step of depositing said plurality of droplets onto said substrate includes the step of depositing droplets of said solder flux onto spaced, selective locations on a surface of a printed circuit board.

9. The method of claim 7 including the step of heating said solder flux.

Please cancel claim 16 and replace with new claim 39 as follows:.

10. A method for dispensing small amounts of liquid material, said method comprising the steps of:
supplying liquid material to an inlet end of a first flow passage extending through a valve assembly having a valve seat disposed near an outlet end of said first flow passage and a reciprocating valve located within said first flow passage;
filling a second flow passage extending through a nozzle assembly with said liquid material when said valve is in a first position spaced from said valve seat, said second flow passage having an inlet section to receive said liquid material from said outlet end of said first flow passage and an outlet section with an orifice extending through an elongated nozzle from which said liquid material is dispensed;
accelerating said valve from said first position to a second position spaced closer to said valve seat than said first position whereby a majority of said liquid material in said first flow passage flows towards said inlet end of said first flow passage and the remaining liquid material in said first flow passage flows from said outlet end into said second flow passage and is dispensed from an outlet of said elongated nozzle as a stream of liquid material;
moving said valve from said second position towards a third position in seating engagement with said valve seat whereby the flow of said liquid material is towards said inlet end of said first flow passage is decreased and the flow of liquid material through said second flow passage is increased; and
moving said valve to said third position where said valve closes against said valve seat whereby the flow of said liquid material through said second flow passage is cut-off and the stream of liquid material being dispensed from said outlet of said elongated nozzle is broken from said outlet end of said nozzle orifice to a form droplet.

11. The method of claim 10 further including the step of locating said second position a distance of less than about three times the diameter of said nozzle orifice.

12. The method of claim 11 further including the step of locating said second position a distance less that about 1.5 times the diameter of said nozzle orifice.

13. The method of claim 10 further including the step of reciprocating said valve between said first position and said third position in less than about 22.6 milliseconds.

14. The method of claim 10 further including the step of dispensing said stream of liquid material through said orifice of said elongated nozzle having a ratio of length to diameter of at least about 3 to 1.

15. The method of claim 14 further including the step of dispensing said stream of liquid material through said orifice having a diameter of between about 0.0020 inches and about 0.0625 inches.

16. A method for rapidly dispensing a minute quantity of a viscous material, comprising the steps of:
providing a chamber for receiving a continuous flow of the viscous material from a source of the viscous material;
providing a nozzle having an exit orifice located adjacent a workpiece surface;
rapidly accelerating the flow of viscous material into the nozzle with a valve for ejecting a stream of the viscous material from the exit orifice; and
positively stopping the flow of the viscous material into the nozzle so the stream breaks away rapidly from the nozzle to form a droplet as a result of forward momentum of the stream and without any need to wet the workpiece surface.

17. A method according to claim 16 further comprising the step of heating the viscous material in the chamber to a predetermined temperature to achieve a predetermined viscosity.

18. A method according to claim 17 wherein the jet of viscous material breaks away from the nozzle before striking the workpiece surface.

19. An apparatus for dispensing small amounts of liquid or viscous material, said apparatus comprising:
a dispenser housing having a flow bore extending therethrough, said dispenser housing having an elongated heated extension element forming an outlet end of the flow bore, an inlet of the flow bore being connected to a source of liquid or viscous material;
a valve seat assembly mounted at the outlet end of said flow bore, said valve seat assembly having a closed lower end with an outlet opening having a valve seat disposed thereabout extending therethrough;
a nozzle assembly mounted to the elongated heated extension element and in flow communication with said outlet opening of the valve seat assembly;
a valve shaft extending through the flow bore having a lower end adapted for seating engagement with the valve seat; and
a heating assembly including a heating element disposed about the elongated heated extension element.

20. The apparatus of claim 19 wherein said nozzle assembly has a nozzle with an elongated orifice with a ratio of length to diameter of at least about 3 to 1.

21. The apparatus of claim 19 further including a control mechanism to reciprocate said lower end of said valve shaft out of and into seating engagement with said valve seat wherein said control mechanism includes a micro adjuster to control the travel distance of said valve shaft.

22. The apparatus of claim 19 wherein said heating element includes a spool with an inner surface in contact with said elongated heated extension element and an outer surface with a thermal foil resistance heater wrapped thereabout.

23. The apparatus of claim 19 wherein said elongated heated extension element is removable from said dispenser housing.

24. The apparatus of claim 23 wherein said heating assembly is removable from said heated extension element.

25. The apparatus of claim 24 wherein said heating element is removable from said heating assembly.

26. An apparatus for dispensing small amounts of liquid material, said apparatus comprising:

- a valve assembly with a first flow passage extending therethrough, said first flow passage having a valve seat disposed near an outlet end thereof and a reciprocating valve located therein;
- a nozzle assembly with a second flow passage extending therethrough, said second flow passage having an inlet section connected to said outlet end of said first flow passage and an outlet section formed of an elongated nozzle with a nozzle orifice extending therethrough, said elongated nozzle having a nozzle tip with an outer diameter of between about 0.0120 inches and about 00.0625 inches.

27. The apparatus of claim 26 wherein said nozzle orifice has a diameter of between about 0.002 inches and about 0.016 inches.

28. The apparatus of claim 27 wherein said nozzle orifice has a ratio of length to diameter of at least about 3 to 1.

29. The apparatus of claim 28 wherein said nozzle orifice has a ratio of length to diameter of at least about 25 to 1.

30. The apparatus of claim 26 wherein at least a part of said nozzle orifice is coated with a low energy surface coating.

31. The apparatus of claim 29 further including a control mechanism to reciprocate said valve at said end of said valve shaft out of and into said seating engagement with said valve seat.

32. The apparatus of claim 31 wherein said control mechanism has a closure force of about 13 to about 17 pounds.

* * * * *

UNITED STATES PATENT AND TRADEMARK OFFICE
Certificate

Patent No. 5,747,102                                          Patented: May 5, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: James C. Smith, Amherst, Ohio; Patrick T. Hogan, Lorain, Ohio; Laurence B. Saidman, Avon Lake, Ohio; John P. Byers, Avon Lake, Ohio; William Donges, Wellington, Ohio; and David Selestak, Avon, Ohio.

Signed and Sealed this Third Day of November, 1998.

SHRIVE BECK
*Supervisory Patent Examiner*
Art Unit 1762